(12) United States Patent
Yoshii et al.

(10) Patent No.: US 10,222,988 B2
(45) Date of Patent: Mar. 5, 2019

(54) EFFICIENT MANAGEMENT STORAGE SYSTEM VIA DEFINING OF SEVERAL SIZE UNITS IN ADVANCE

(71) Applicant: HITACHI, LTD., Tokyo (JP)

(72) Inventors: Yoshihiro Yoshii, Tokyo (JP); Kazuei Hironaka, Tokyo (JP); Akira Yamamoto, Tokyo (JP); Norio Shimozono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 124 days.

(21) Appl. No.: 15/128,089

(22) PCT Filed: Apr. 22, 2014

(86) PCT No.: PCT/JP2014/061238
§ 371 (c)(1),
(2) Date: Sep. 21, 2016

(87) PCT Pub. No.: WO2015/162681
PCT Pub. Date: Oct. 29, 2015

(65) Prior Publication Data
US 2017/0123679 A1    May 4, 2017

(51) Int. Cl.
*G06F 3/06*   (2006.01)
*G06F 12/04*  (2006.01)
(Continued)

(52) U.S. Cl.
CPC .............. *G06F 3/0608* (2013.01); *G06F 3/06* (2013.01); *G06F 3/0619* (2013.01);
(Continued)

(58) Field of Classification Search
CPC .... G06F 3/0608; G06F 3/0685; G06F 3/0619; G06F 12/0802; G06F 3/0661; G06F 2212/60; G06F 2212/401; G06F 12/0246
See application file for complete search history.

(56) References Cited

U.S. PATENT DOCUMENTS 8,131,927 B2 * 3/2012 Kawaguchi ........... G06F 3/0608
707/693
2009/0144496 A1   6/2009 Kawaguchi
(Continued)

FOREIGN PATENT DOCUMENTS

JP   07-261938 A    10/1995
JP   2012-504795 A   2/2012
JP   2014-506688 A   3/2014

*Primary Examiner* — Tuan V Thai
*Assistant Examiner* — Tasnima Matin
(74) *Attorney, Agent, or Firm* — Volpe and Koenig, P.C.

(57) ABSTRACT

A storage system is adapted for efficiency by defining beforehand a first size, which is the maximum data that can be read at one time, a second size, which is equal to or less than the first size, and a third size, which is a factor of the first size. A controller provides a virtual volume comprising a plurality of virtual pages. Upon receiving a write request, the controller allocates a pool area comprising a plurality of stripes of the first size, stores the write request data in a cache, and when writing the data stored in the cache to the storage device, compresses the data in accordance with the third size unit, selects a storage area in accordance with the second size unit, and writes the compressed data to the selected second size storage area sequentially from the start address of a free area without leaving spaces therebetween.

8 Claims, 17 Drawing Sheets

(51) Int. Cl.
*G06F 12/0802* (2016.01)
*G06F 12/0804* (2016.01)
*G06F 12/0868* (2016.01)
*G06F 12/1009* (2016.01)

(52) U.S. Cl.
CPC .......... *G06F 3/0661* (2013.01); *G06F 3/0685* (2013.01); *G06F 12/04* (2013.01); *G06F 12/0802* (2013.01); *G06F 12/0804* (2013.01); *G06F 12/0868* (2013.01); *G06F 12/1009* (2013.01); *G06F 2212/1016* (2013.01); *G06F 2212/1024* (2013.01); *G06F 2212/262* (2013.01); *G06F 2212/312* (2013.01); *G06F 2212/401* (2013.01); *G06F 2212/60* (2013.01)

(56) References Cited

U.S. PATENT DOCUMENTS

| | | | | |
|---|---|---|---|---|
| 2010/0306498 | A1* | 12/2010 | Shiga | G06F 3/0608 711/203 |
| 2012/0102294 | A1 | 4/2012 | Shiga | |
| 2012/0317333 | A1* | 12/2012 | Yamamoto | G06F 3/0608 711/103 |
| 2013/0007360 | A1 | 1/2013 | Shiga | |

* cited by examiner

[Fig.1]
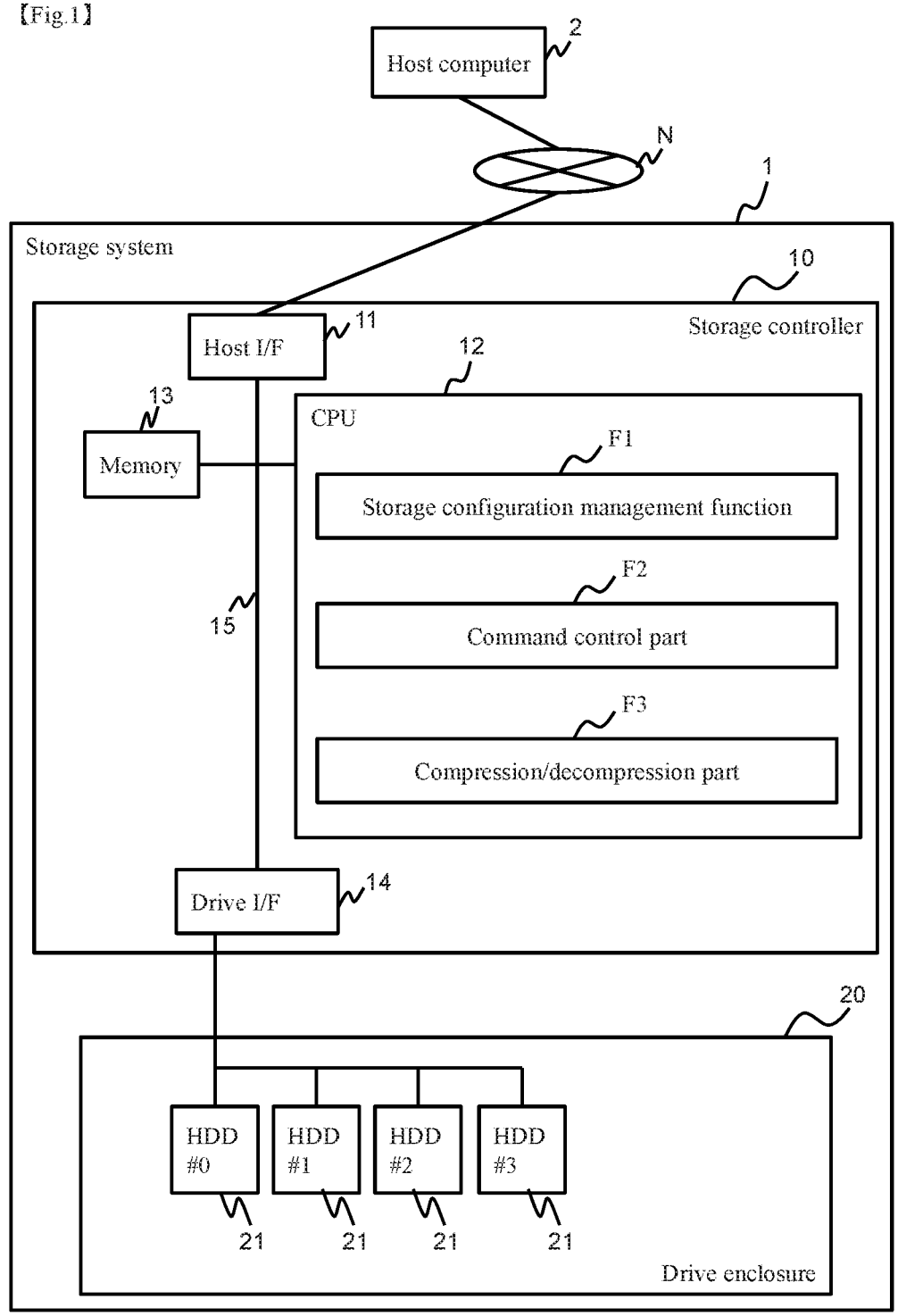

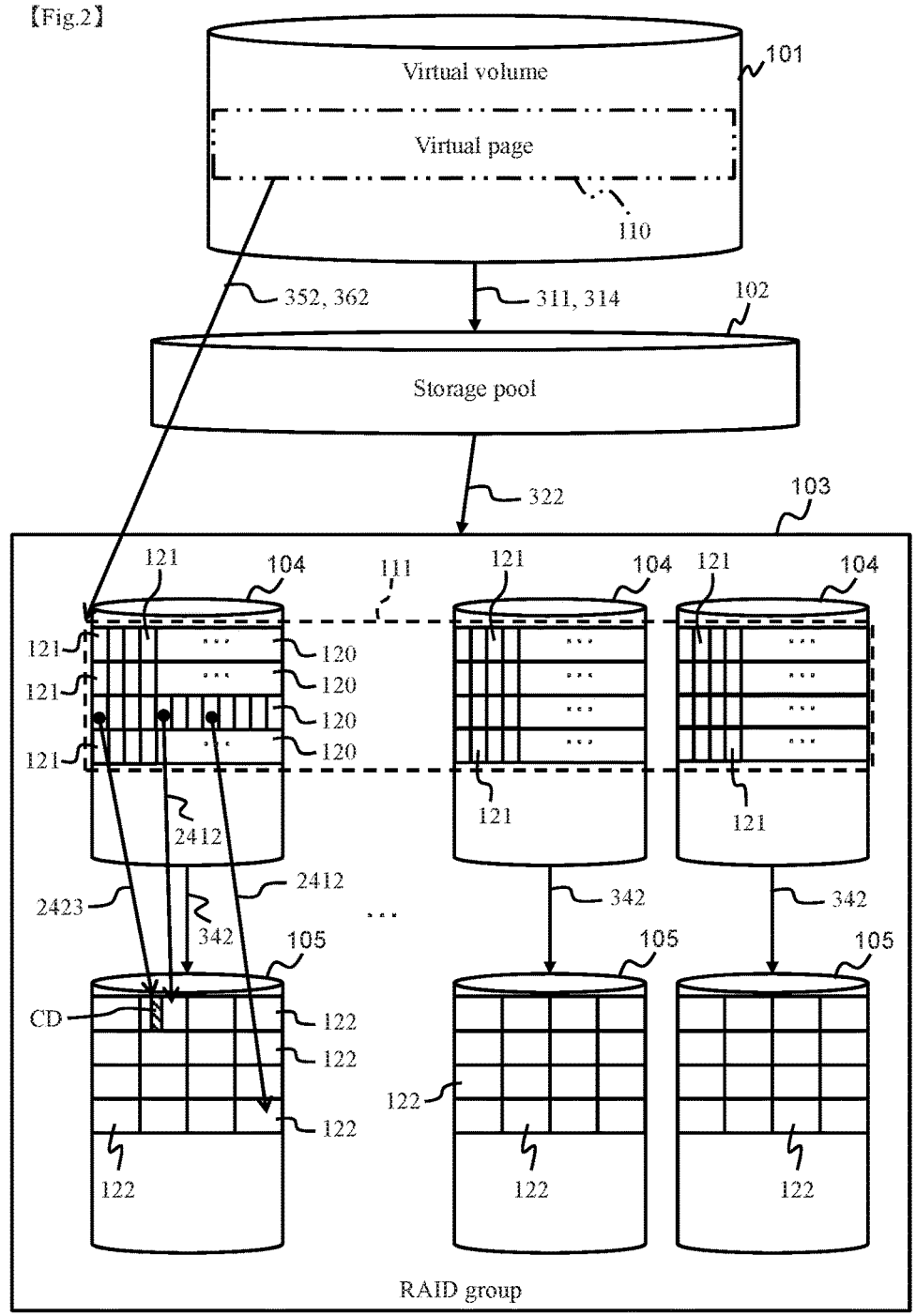

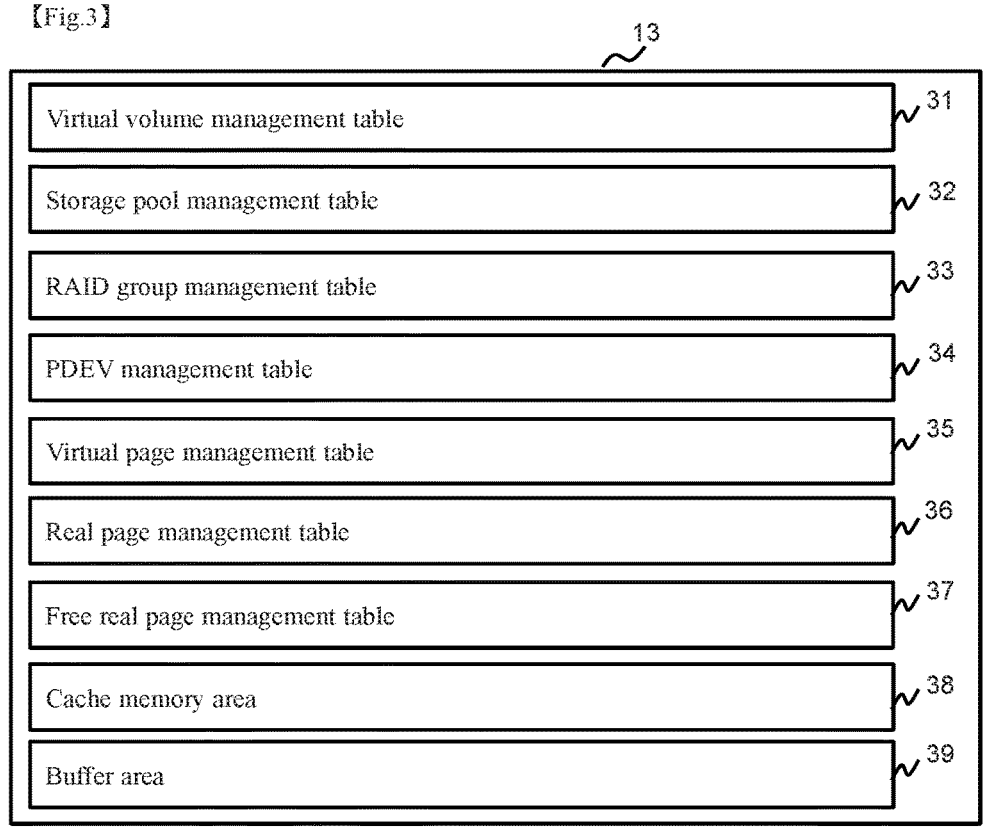

[Fig.4]
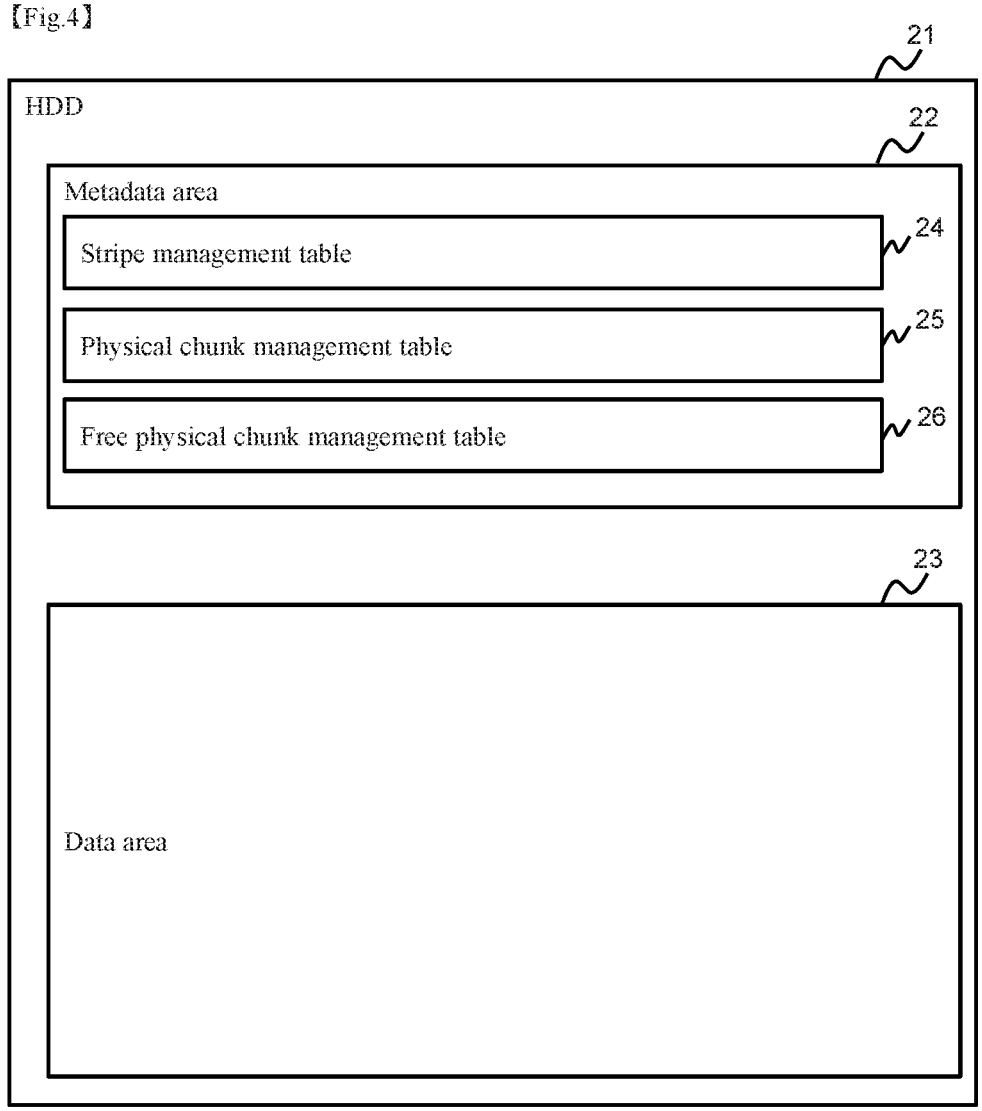

[Fig.5]
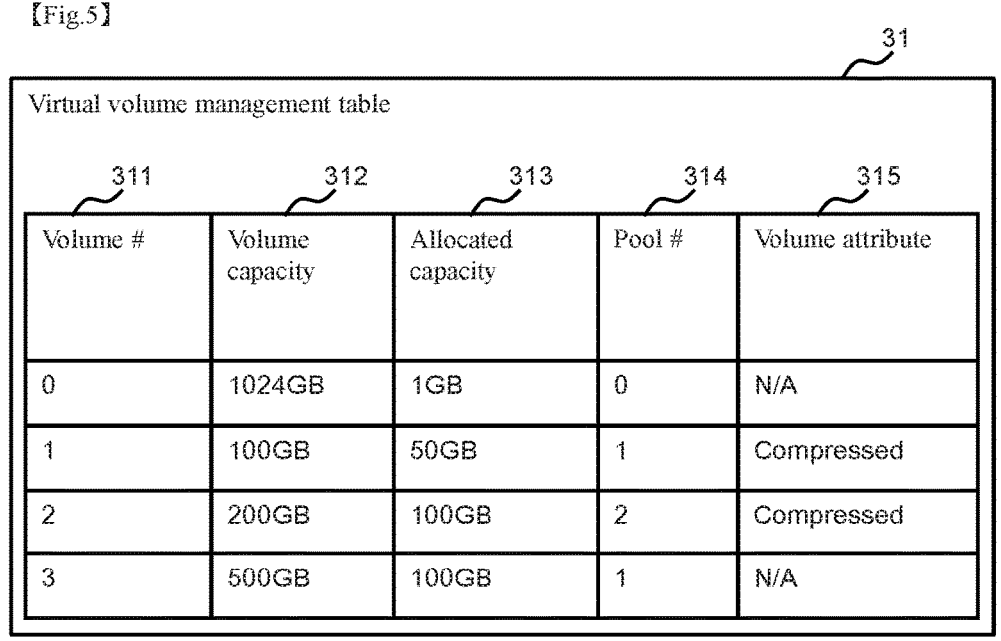
Virtual volume management table 31
| Volume # 311 | Volume capacity 312 | Allocated capacity 313 | Pool # 314 | Volume attribute 315 |
|---|---|---|---|---|
| 0 | 1024GB | 1GB | 0 | N/A |
| 1 | 100GB | 50GB | 1 | Compressed |
| 2 | 200GB | 100GB | 2 | Compressed |
| 3 | 500GB | 100GB | 1 | N/A |
[Fig.6]
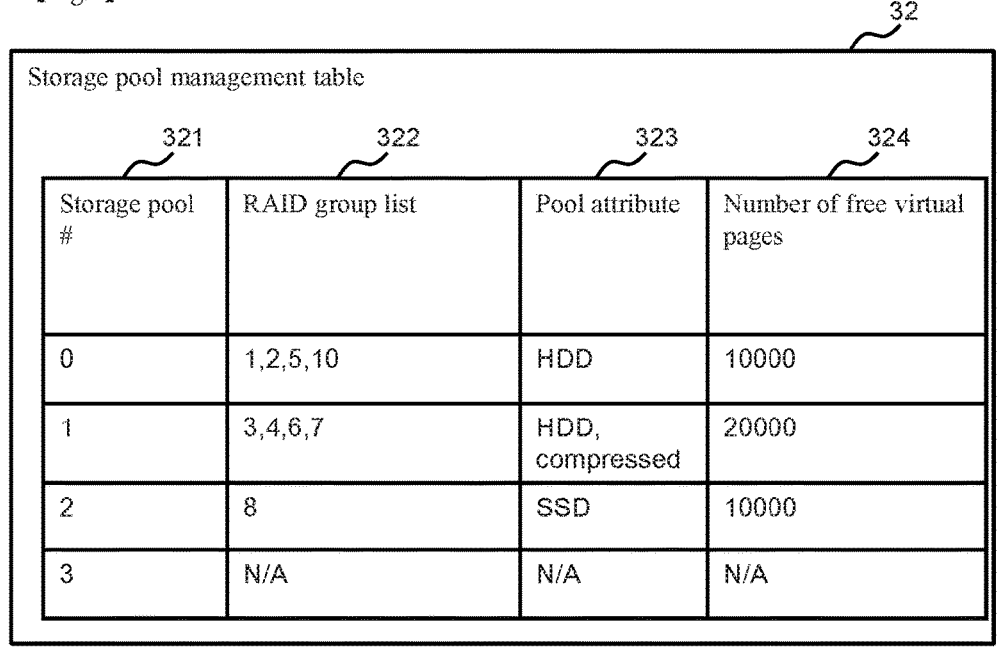
Storage pool management table 32
| Storage pool # 321 | RAID group list 322 | Pool attribute 323 | Number of free virtual pages 324 |
|---|---|---|---|
| 0 | 1,2,5,10 | HDD | 10000 |
| 1 | 3,4,6,7 | HDD, compressed | 20000 |
| 2 | 8 | SSD | 10000 |
| 3 | N/A | N/A | N/A |

[Fig.7]
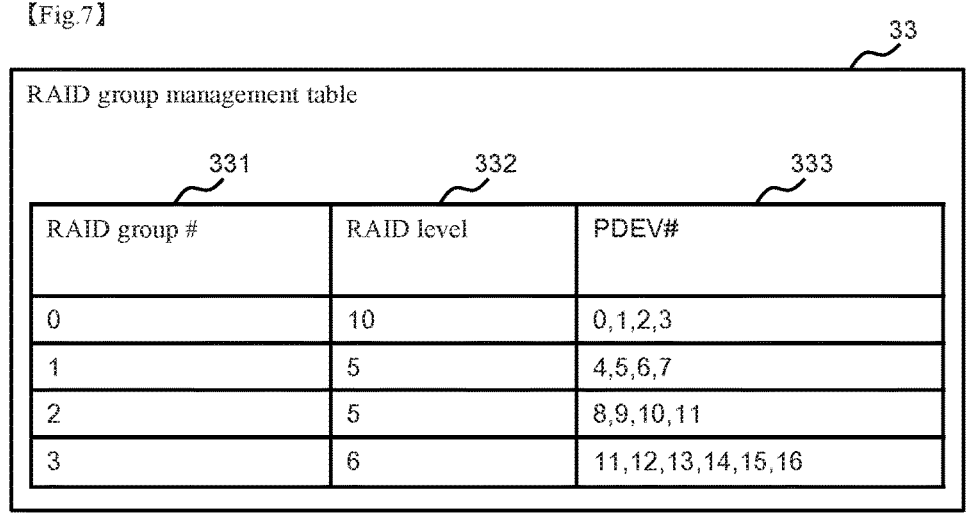
[Fig.8]
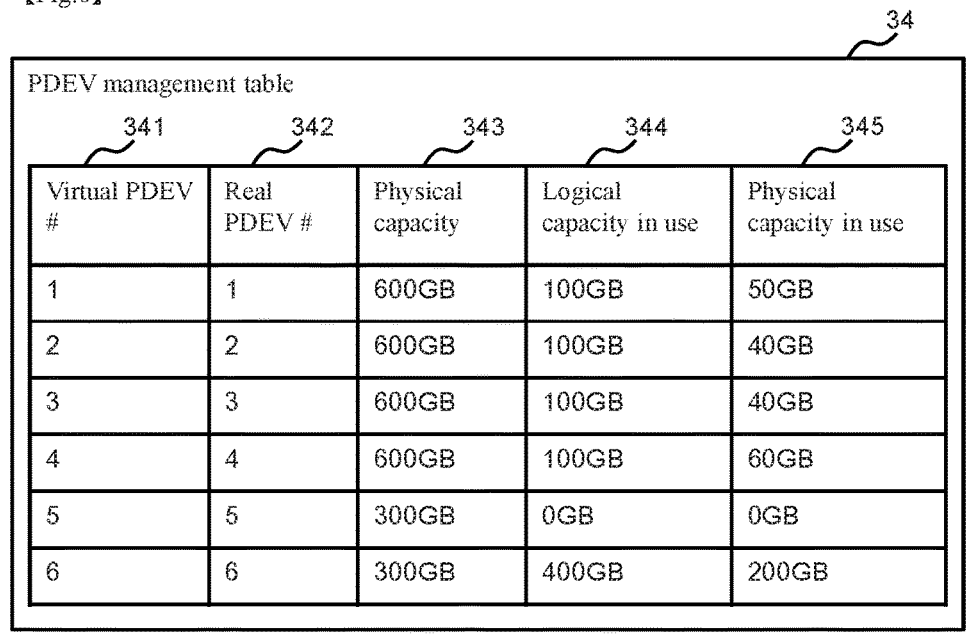

[Fig.9]

Virtual page management table — 35

| Virtual volume # | 1 | 351 |
| Real page pointer | 0x1000 | 352 |
| Page attribute | Compressed | 353 |
| Statistical information | 0 IOPS | 354 |

Virtual page management table — 35

| Virtual volume # | 1 | 351 |
| Real page pointer | NULL | 352 |
| Page attribute | uncompressed | 353 |
| Statistical information | 100 IOPS | 354 |

Real page management table — 36

| RAID group # | 1 | 361 |
| Real page start address | 0x0000 | 362 |
| Free page pointer | NULL | 363 |

Real page management table — 36

| RAID group # | 1 | 361 |
| Real page start address | 0x0000 | 362 |
| Free page pointer | NULL | 363 |

⋮

[Fig.11]
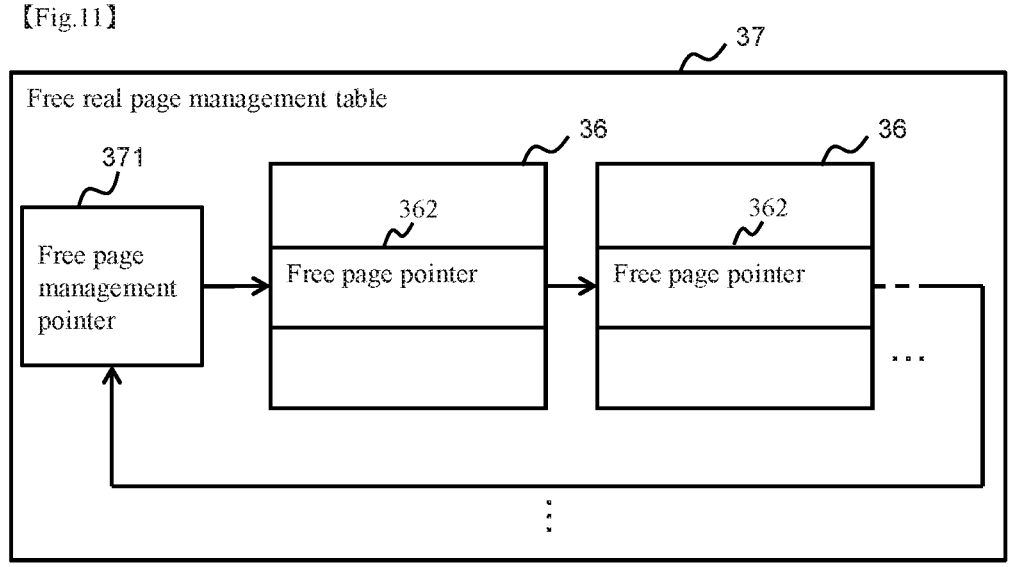

[Fig.12]

Stripe management table (24)

| | | |
|---|---|---|
| Stripe physical address | 1 | 2400 |
| Final physical chunk # | 0 | 2401 |
| Final physical chunk pointer | 6KB | 2402 |
| Valid data size (uncompressed) | 8KB | 2403 |
| Valid data size (compressed) | 6KB | 2404 |

<Physical chunk mapping table> (2410)

| Physical chunk in stripe # (2411) | Physical chunk address (2412) |
|---|---|
| Physical chunk (#0) | 0x2000 |
| Physical chunk (#1) | NULL |
| | |
| Physical chunk (#7) | NULL |

<Sub-stripe mapping table> (2420)

| Sub-stripe # (2421) | Storage-destination physical chunk # (2422) | Offset in physical chunk (2423) | Compression valid flag (2424) | Post-compression data length (2425) |
|---|---|---|---|---|
| Sub-stripe (#0) | #0 | 0KB | ON | 2KB |
| Sub-stripe (#1) | NULL | NULL | NULL | NULL |
| | | | | |
| Sub-stripe (#128) | #0 | 2KB | OFF | 4KB |

[Fig.13]
Physical chunk management table — 25
| Physical chunk start address | 0x0000 | 2500 |
| Free physical chunk pointer | NULL | 2501 |
| Physical chunk start address | 0x0000 | 2500 |
| Free physical chunk pointer | NULL | 2501 |
⋮
[Fig.14]
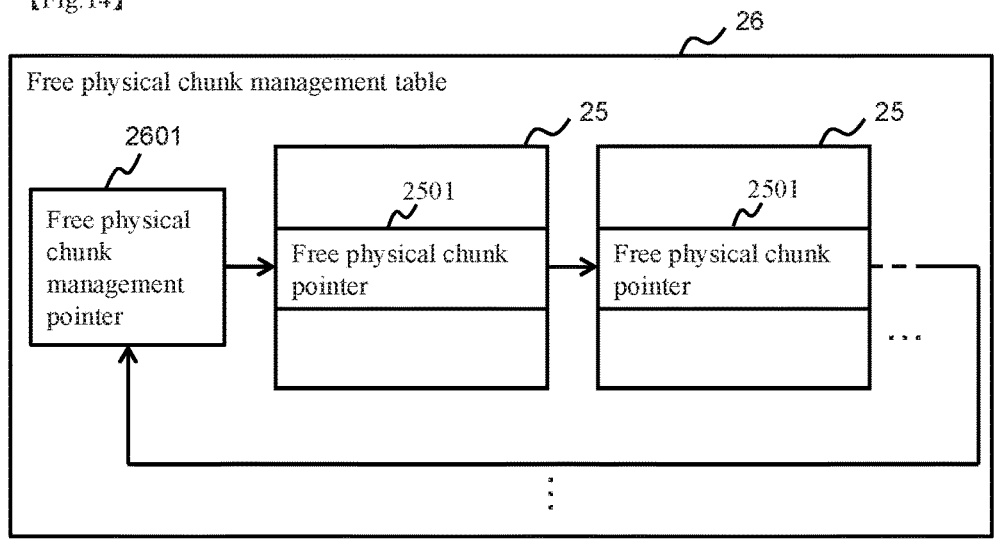

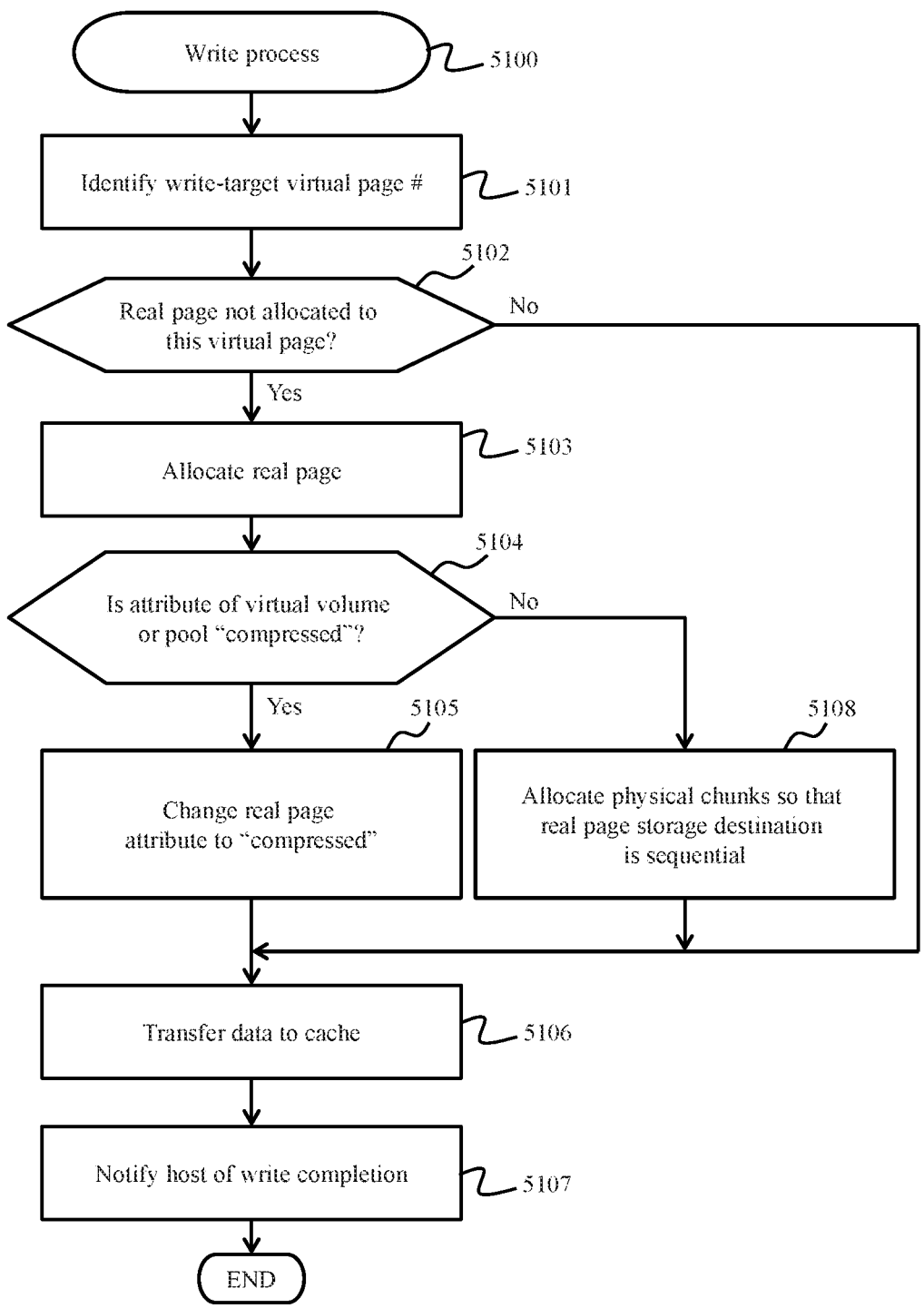

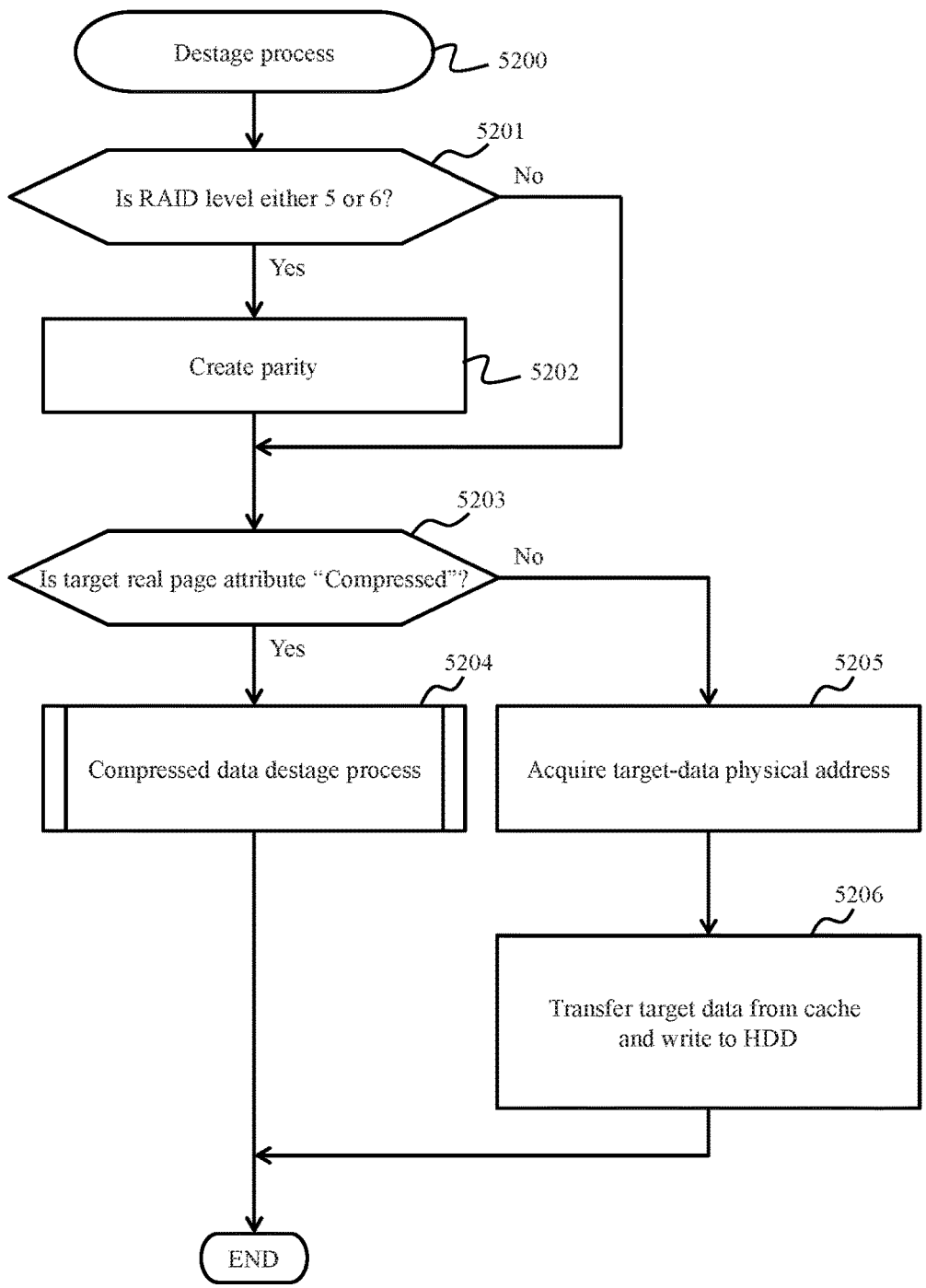

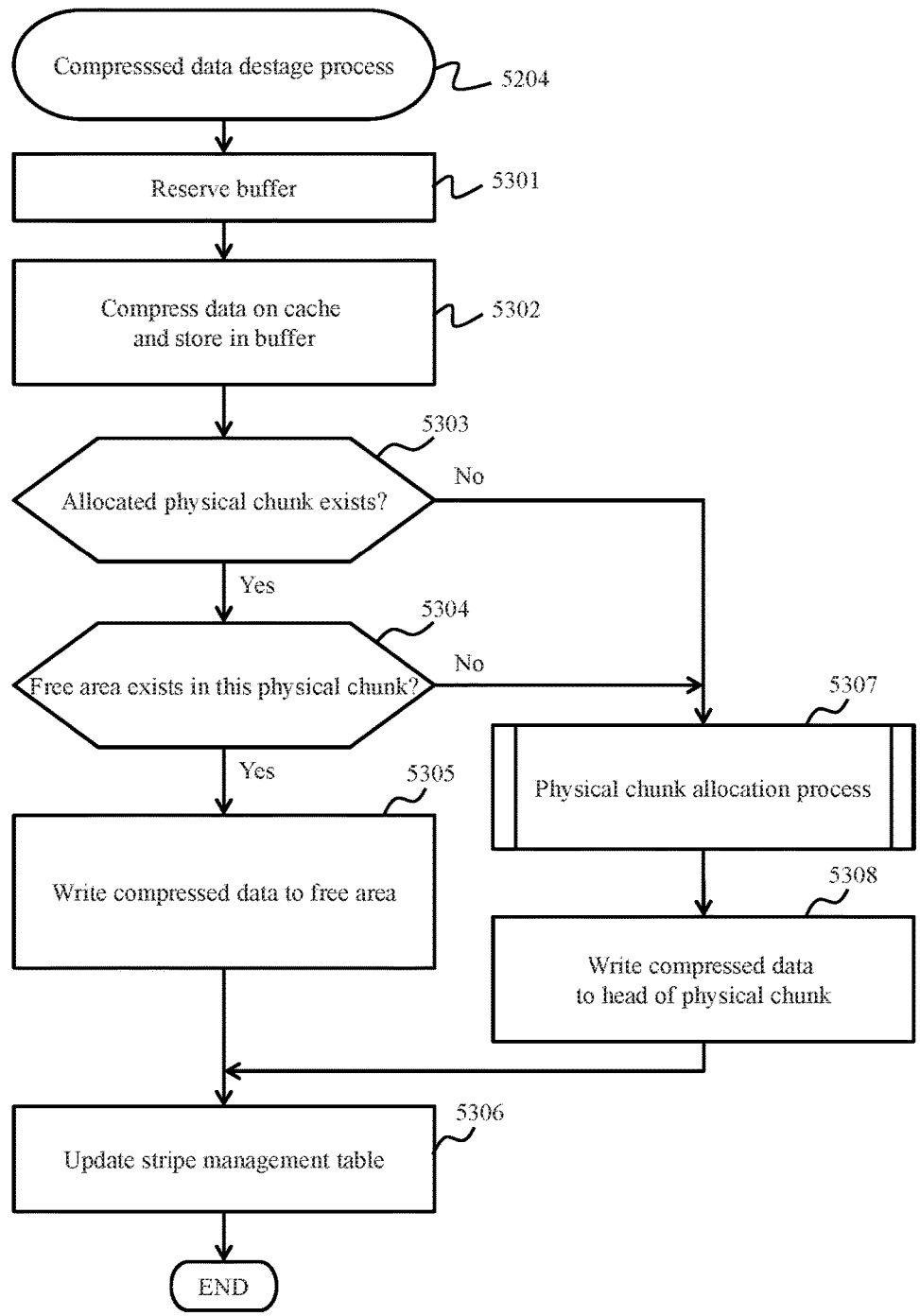

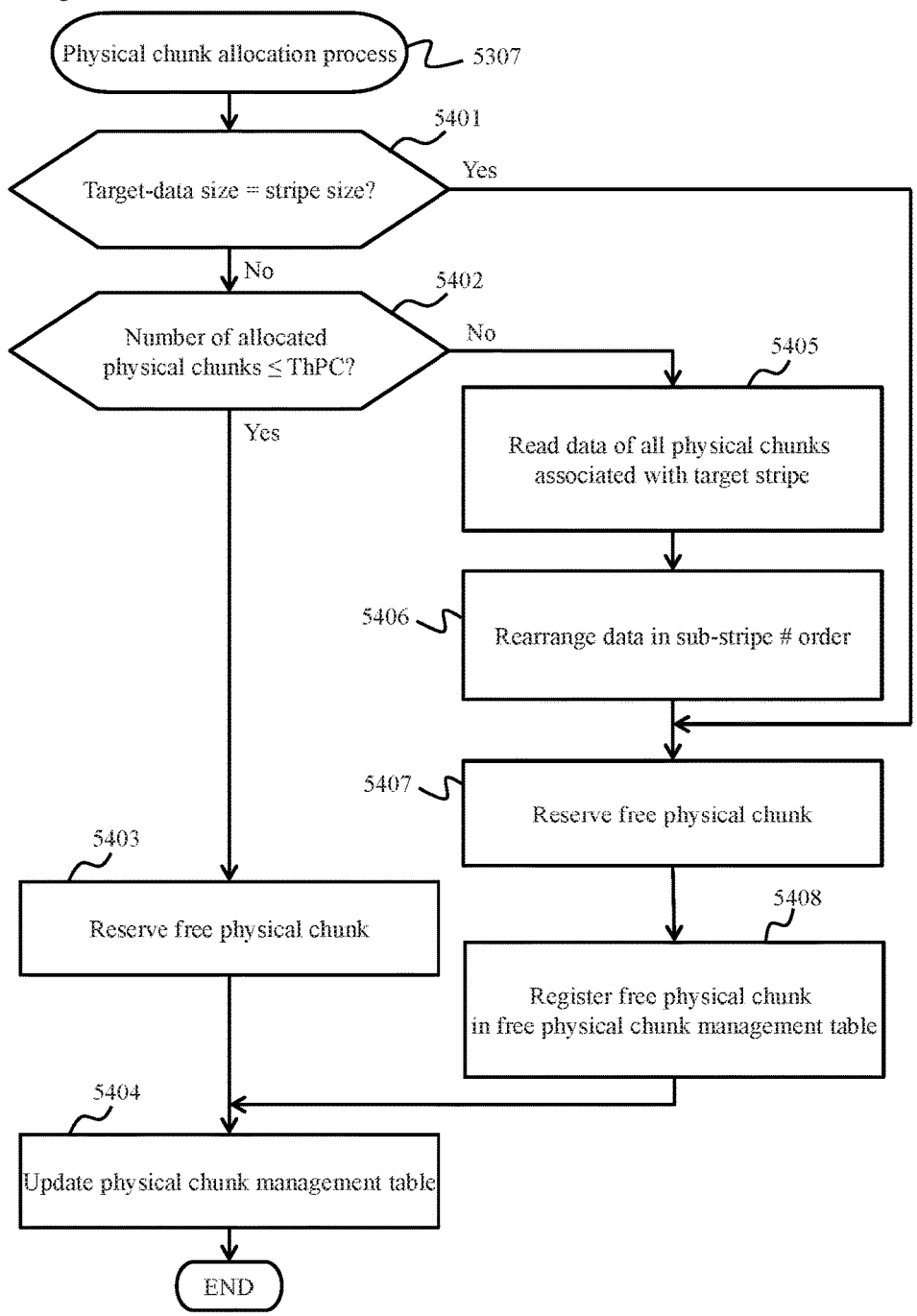

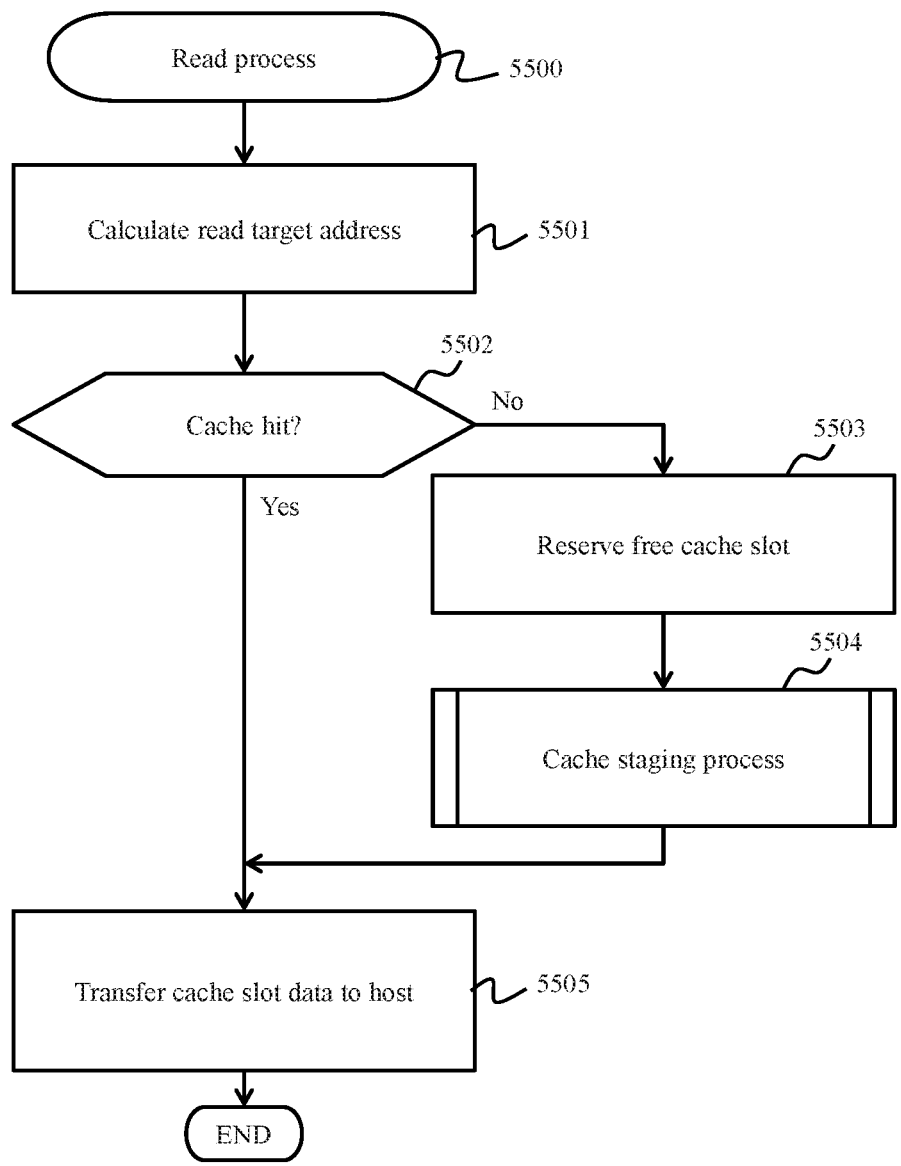

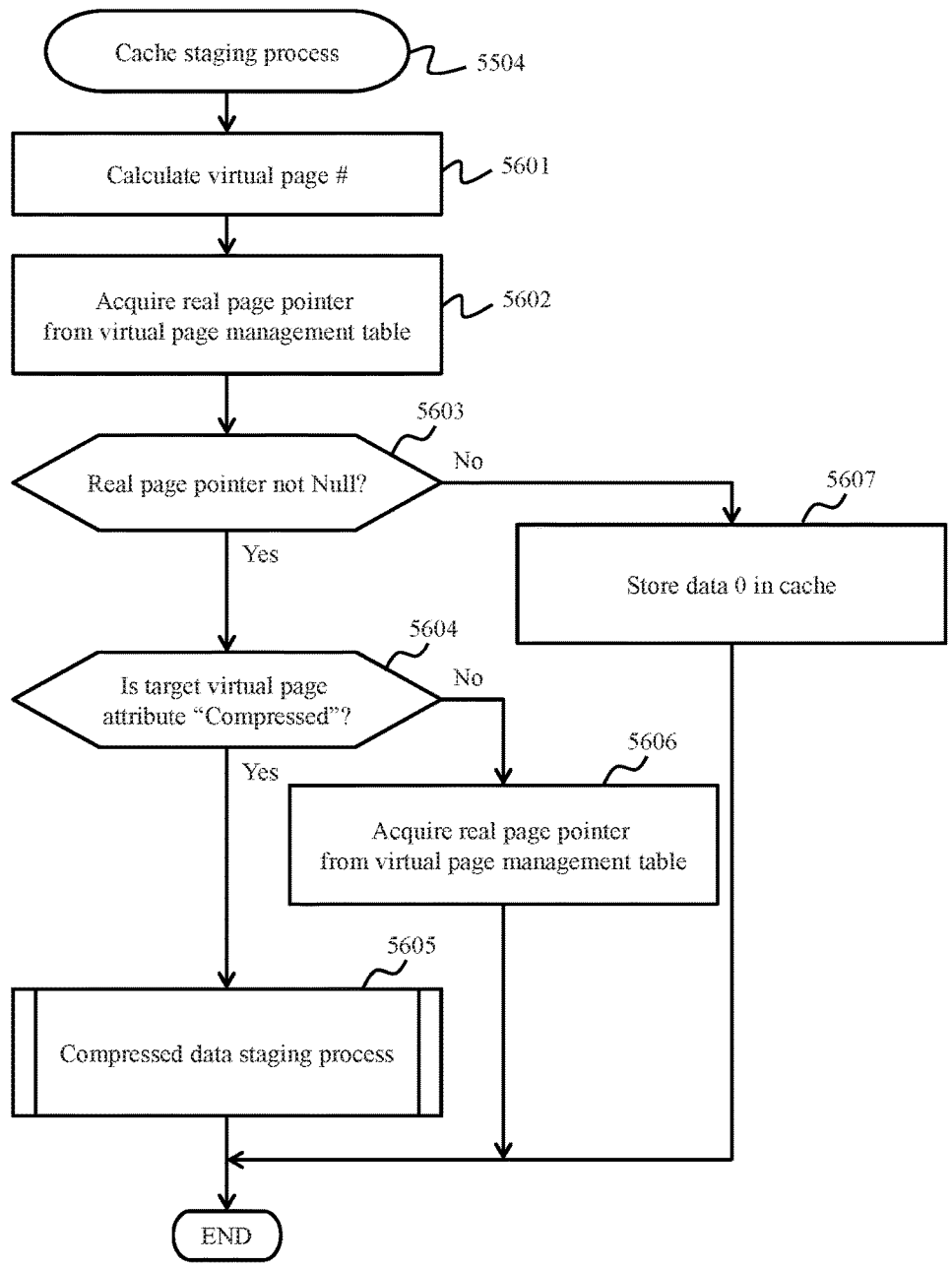

[Fig.21]
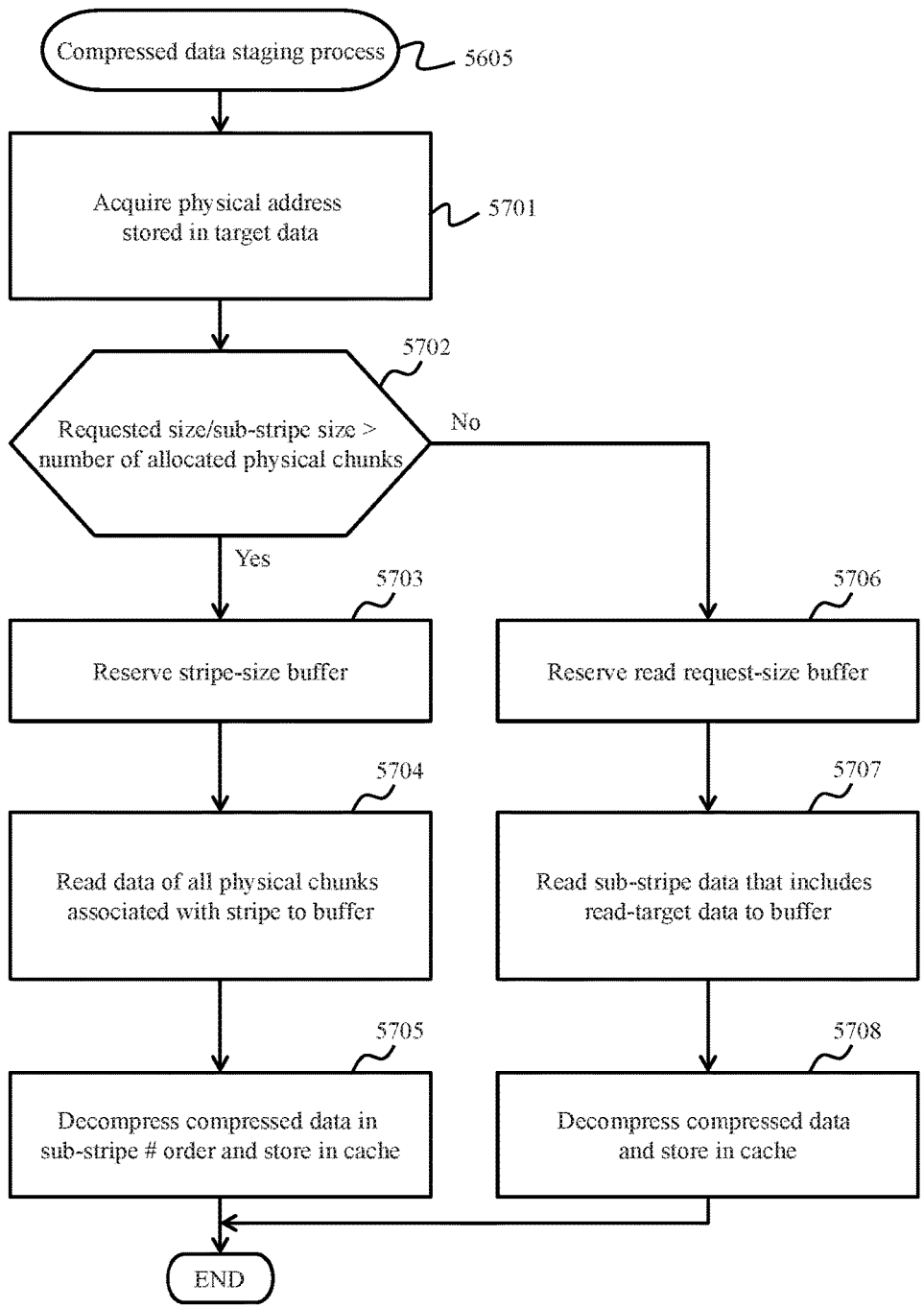

100 # EFFICIENT MANAGEMENT STORAGE SYSTEM VIA DEFINING OF SEVERAL SIZE UNITS IN ADVANCE

TECHNICAL FIELD

The present invention relates to a storage system and a storage device control method.

BACKGROUND ART

In order to reduce storage bitcosts, there is an increasing need for technology that reduces data volume. On the one hand, data compression technologies are known as technologies for reducing data volume. On the other hand, capacity virtualization technologies are known as technologies for reducing the capacity used in data storage. Capacity virtualization technologies show a host apparatus or the like, which exists outside of a storage system, a virtual capacity that is larger than a physical storage capacity capable of being used by the storage system.

In Patent Literature 1, a data compression technology and a capacity virtualization technology are used to dynamically allocate a storage destination area inside a pool to compressed data in accordance with the post-compression data size thereof. This enables Patent Literature 1 to increase storage capacity utilization efficiency. In addition, Patent Literature 1 does away with the need for a user to prepare a volume of a size that corresponds to the post-compression data size, thereby enhancing usability.

CITATION LIST

Patent Literature

[PTL 1]
US Patent Application Publication No. 2009/0144496

SUMMARY OF INVENTION

Technical Problem

Generally speaking, there is a trade-off between the unit for data compression/decompression and the processing load of the storage controller. A case in which the compression/decompression unit is made smaller will be considered. In this case, when a small-sized data read is requested by the host, since only the requested data needs to be decompressed and data that was not requested need not be decompressed, data read performance is enhanced.

However, the unit for compression/decompression is generally also the unit that the storage controller uses to issue a compression/decompression indication to a compression/decompression circuit, and/or the unit that the host uses to perform associations between a logical address to be accessed and a physical address of a final storage medium. Therefore, when the compression/decompression unit is scaled down, the number of times that compression/decompression is indicated to the compression/decompression circuit and the number of times that associations are made with the physical address of the final storage medium increase when large-sized data is read, thereby increasing the load on the storage controller. In addition, since the number of data reads for a final storage medium such as a hard disk drive also increases, the load on the final storage medium also increases.

Alternatively, when the compression/decompression unit is scaled up, the load on the storage controller is reduced when the read size is large. However, data must be read using the compression/decompression unit even when data smaller in size than the compression/decompression unit is read. Thus, the storage controller reads and decompresses all the data in compression/decompression units, and extracts small-sized data from thereamong. Therefore, when the compression/decompression unit is made larger, the read performance for small-sized data deteriorates.

A trade-off relationship like this exists between the compression/decompression unit and the processing load of the storage controller, but in Patent Literature 1, the compression/decompression unit is fixed, and the above-described trade-off is not taken into account.

With the foregoing problem in mind, an object of the present invention is to provide a storage system and a storage device control method that are capable of increasing efficiency. Another object of the present invention is to provide a storage system and a storage device control method that make small-size data read/write performance compatible with large-size data read performance.

Solution to Problem

In one aspect of the present invention, in a storage system having at least one storage device, a controller for controlling the storage device, and a cache, a first size, which is the maximum size of data that can be read at one time from the storage device, a second size, which is equal to or less than the first size, and a third size, which is a factor of the first size and is configured at a smaller value than the first size and the second size, are defined beforehand, the controller provides a virtual volume comprising a plurality of virtual pages, and upon receiving a request for write to the virtual volume, allocates in accordance with the virtual page size a pool area comprising a plurality of stripes of the first size, and stores the write request data in the cache, and when writing the data stored in the cache to the storage device, creates compressed data by compressing the data in accordance with the third size unit, selects a storage area of the storage device in accordance with the second size unit, and writes the compressed data to the selected second size storage area sequentially from the start address of a free area of the second size storage area without leaving spaces therebetween.

Advantageous Effects of Invention

According to the present invention, a prescribed third size is set as the compression/decompression unit, and compressed data is written to a second size storage area sequentially from the start address of the second size storage area without leaving spaces therebetween, thereby making it possible to ascertain the location of the compressed data by simply managing the offset in the second size storage area. Management efficiency can therefore be increased.

BRIEF DESCRIPTION OF DRAWINGS

FIG. 1 illustrates the configuration of a storage system.
FIG. 2 is an illustrative drawing illustrating the relationships between a virtual volume, a pool, a virtual page, a real page, a stripe, a sub-stripe, and a physical chunk.
FIG. 3 is a block diagram showing the storage contents of a cache memory.

FIG. 4 is a block diagram showing the storage contents of a hard disk drive as an example of a storage device.

FIG. 5 shows an example of the configuration of a table for managing a virtual volume.

FIG. 6 shows an example of the configuration of a table for managing a storage pool.

FIG. 7 shows an example of the configuration of a table for managing a RAID (Redundant Arrays of Inexpensive Disks) group.

FIG. 8 shows an example of the configuration of a table for managing a hard disk drive as a physical device (PDEV).

FIG. 9 shows an example of the configuration of a table for managing a virtual page.

FIG. 10 shows an example of the configuration of a table for managing a real page.

FIG. 11 shows an example of the configuration of a table for managing a free real page (a real page that is free).

FIG. 12 shows an example of the configuration of a table for managing a stripe.

FIG. 13 shows an example of the configuration of a table for managing a physical chunk.

FIG. 14 shows an example of the configuration of a table for managing a free physical chunk (a physical chunk that is free).

FIG. 15 shows a flowchart of a write process.

FIG. 16 shows a flowchart of a destage process.

FIG. 17 shows a flowchart of a process for destaging compressed data.

FIG. 18 shows a flowchart of a process for allocating a physical chunk.

FIG. 19 shows a flowchart of a read process.

FIG. 20 shows a flowchart of a process for staging data to the cache.

FIG. 21 shows a flowchart of a process for staging compressed data to the cache.

DESCRIPTION OF EMBODIMENTS

An embodiment of the present invention will be described below while referring to the drawings. Furthermore, in the following description, various types of information may be described using the expression "management table", but the various information may also be expressed using a data structure other than a table. To show that the various information is not dependent on the data structure, a "management table" can be called "management information". The description will be provided by giving a hard disk drive as an example of a "storage device", but a flash memory device can also be applied to at least a portion of the embodiment.

Also, there may be cases where processing is described having "program" as the doer of the action. The stipulated processing is performed in accordance with this program being executed by a processor, a central processing unit (CPU), for example. Furthermore, this processing is performed while using a storage resource (for example, a memory) and a communication interface device (for example, a communication port) as needed, and therefore the processor may also be considered the doer of the action. The processor may comprise dedicated hardware other than the CPU. A computer program may be installed in respective computers from a program source. The program source, for example, may be provided by either a program delivery host computer or a storage medium.

Furthermore, respective elements are identifiable using a number or the like, but as long as the information is identifiable, names and other such types of identification information may be used. In the description and drawings of the present invention, like reference signs are used for like components, but the present invention is not limited to these examples, and all possible examples of applications that correspond to the idea of the present invention are included in the technical scope of the present invention. Furthermore, unless otherwise limited, the respective components may be either singular or plural in number.

In the present embodiment, when small size data is read, the decompression of unnecessary data other than the target data is suppressed, and, in addition, when large size data is read, the loads on the controller and the hard disk drive are reduced.

As will be described in detail below, in the embodiment, a logical address area is divided into stripes comprising a RAID group. The stripe size is equivalent to a "first size". A physical storage area of a hard disk is managed by being divided into units called a chunk (physical chunk), which is smaller than a stripe. The physical chunk size is equivalent to a "second size". The storage system controller compresses data with respect to a stripe, and allocates a chunk corresponding to a post-compression data size only as needed.

The controller compresses and decompresses data in sub-stripe size units that are smaller than the stripe size to deal with read requests and write requests for data of a size that does not meet the stripe size. The sub-stripe size is equivalent to a "third size". A stripe is divided into sub-stripe units, and a sub-stripe size area constitutes the unit for compression and decompression.

When large size data is read, the data is read in chunk units and is decompressed in sub-stripe units, and the data is rearranged on the cache memory in logical address order. Because a large size sequential read request can be processed in chunk units, the processing load on the controller can be alleviated, and the load on the hard disk can be lowered by reducing the number of accesses to the hard disk. The throughput performance of the hard disk drive can be enhanced when the controller reads compressed data sequentially.

In addition, for small size data, data is read and written in sub-stripe units. In accordance with this, it is only necessary to either compress or decompress the target data; compression or decompression need not be performed for data that is not needed. Therefore, processing performance is enhanced.

Example 1

FIG. 1 is a block diagram illustrating the overall configuration of a storage system 1. The storage system 1 is provided with a controller 10, and a drive enclosure 20, for example. The storage system 1 sends/receives a data block to/from a host computer 2 via a communication network N. There may be one, or two or more controllers 10. There may be one, or two or more drive enclosures 20. Hereinafter, the host computer 2 may be abbreviated as host 2.

The controller 10, for example, has a host interface (I/F) 11, a central processing unit (CPU) 12, a cache memory 13 (may be abbreviated as CM hereinafter), and a drive I/F 14. There may be two or more of any of these elements 11 to 14. These elements 11 to 14 are connected by way of an internal bus 15 that is capable of two-way data transmission.

The communication network N, for example, can be configured using a storage area network (SAN). The SAN, for example, can be configured using a Fibre Channel Ethernet (registered trademark) and/or Infiniband or the like.

The communication network N may be a LAN, an Internet network, a dedicated line network, or a combination thereof.

The host I/F 11 is for connecting the controller 10 to the communication network N. The host I/F 11 can be called a "higher-level communication part", a "first communication part", a "higher-level apparatus interface part" or the like, for example. The host I/F 11 is disposed between the communication network N and the internal bus 15, and controls the sending and receiving of data blocks.

The host I/F 11 receives an input/output (I/O) request from the host 2. In the I/O request, information indicating an I/O destination (access destination information) is associated with an I/O command. The I/O destination information includes information for identifying an I/O destination logical volume, and address information for identifying an I/O destination area in the logical volume. The identification information for the I/O destination logical volume is a logical unit number (LUN), for example. The address information for identifying the I/O destination area in the logical volume is a logical block address (LBA), for example. The I/O command is either a write command or a read command.

The CPU 12 realizes various functions F1, F2, F3 by executing a prescribed computer program (called "program" hereinbelow). The program may be stored in a nonvolatile memory area (not shown in the drawing) in the controller 10, or may be stored in a hard disk drive (HDD) 21 outside of the controller 10. A storage configuration management part F1, for example, is a function for managing various types of storage configurations, such as a RAID group configuration, a pool configuration, and a virtual volume configuration. A command control part F2 is a function for processing a read command and/or a write command received from the host 2, and returning a result thereof to the host 2. A compression/decompression part F3 is a function for compressing data and/or decompressing compressed data in accordance with a prescribed algorithm. In the following description, the compression/decompression part F3 may be called compression part F3. The compression/decompression part F3, for example, is provided with a reverse data compression algorithm like LZ77 or the like.

The CPU 12, upon receiving an I/O command from the host 2, extracts the I/O destination information associated with the I/O command, and identifies an I/O destination area based on the I/O destination information. The CPU 12 identifies one or more HDDs for respectively providing one or more logical pages corresponding to the identified I/O destination area. Then, the CPU 12 sends to each identified HDD 21 an I/O command to which a logical page address has been associated. In addition to the logical page address, identification information (a drive number, for example) for identifying the send destination HDD 21 of the I/O command may be associated with the I/O command sent to each HDD 21.

The CM 13 holds a data block temporarily. Hereinbelow, the data block may be abbreviated as data. The CM 13 may comprise a nonvolatile memory. The nonvolatile memory may be a flash memory, a magnetic disk memory, or the like. Or, the configuration may be such that the CM 13 is provided with a backup power source for a volatile memory. The volatile memory may be a dynamic random access memory (DRAM) or the like. The backup power source may be a battery, such as a lithium ion rechargeable battery, for example. The host I/F 11, the CPU 12, and/or the drive I/F may input/output a data block to/from the CM 13 via the internal bus 15.

The drive I/F 14 is for coupling the drive enclosure 20 to the controller 10. The drive I/F 14 can also be called a "lower-level communication part", a "second communication part", a "storage device interface part" or the like, for example.

The drive I/F 14 is disposed between the HDD 21 and the internal bus 15, and controls the sending and receiving of a data block. The drive I/F 14 may be an I/F that supports either SAS or Fibre Channel, or the like. The drive I/F 14 may send a data block received from the HDD 21 to the CM 13.

The drive enclosure 20 has a plurality of storage devices. In FIG. 1, HDDs 21 (#0, #1, #2, #3) are shown as the storage devices. Hereinbelow, when no distinction is being made between the HDDs 21 (#0, #1, #2, #3), they will simply be called "HDD 21". The drive enclosure 20 may have any number of HDDs 21. Another nonvolatile memory, such as a solid state drive (SSD), may be coupled to the drive enclosure 20 either in place of a HDD 21 or together with the HDDs 21. The drive I/F 14 and the HDD 21 may be coupled using a serial attached SCSI (SAS), a Fibre Channel (FC), or a serial AT attachment (SATA).

An HDD 21 of the drive enclosure 20, upon receiving from the controller 10 an I/O command (a read command or a write command) in which the address of a logical page provided by the HDD 21 has been specified, executes the processing corresponding to this I/O command.

The HDD 21 may be called a physical device (PDEV) below. In the present embodiment, data equal to or larger than the physical capacity of a PDEV can be stored using data compression. That is, two types of PDEV exist: a PDEV that provides physical capacity as-is; and a virtual PDEV that can store data equal to or larger than a physical capacity using data compression. Hereinbelow, the PDEV that provides physical capacity as-is is called a real PDEV 105, and the virtual PDEV that can store data equal to or larger than a physical capacity is called a virtual PDEV 104.

The storage system 1 may have two or more drive enclosures 20. In this case, the drive I/F 14 has a plurality of ports, and one drive enclosure 20 may be coupled to one port of the drive I/F 14. Or, two or more drive enclosures 20 may be coupled to one drive I/F 14 via a prescribed switching apparatus (not shown in the drawing). Or, two or more drive enclosures 20 may be coupled in a cascading manner.

FIG. 2 illustrates the relationships between a virtual volume 101, a storage pool 102, a RAID group 103, a virtual PDEV 104, a real PDEV 105, a virtual page 110, a real page 111, a stripe 120, a sub-stripe 121, and a physical chunk 122. The controller 10 provides a capacity virtualization function in accordance with this configuration. A RAID group may also be called a parity group.

The virtual volume 101 provided to the host 2 is partitioned into a plurality of virtual pages 110. A storage area comprising one or more RAID groups 103 is partitioned into a plurality of real pages 111. An aggregation of a plurality of real pages 111 is called a storage pool 102. In capacity virtualization, the storage capacity of the virtual volume 101 can be made to look larger than the actual capacity. Thus, generally speaking, the number of virtual pages 110 is more numerous than the number of real pages 111.

The controller 10 allocates a free real page 111 from the storage pool 102 to a virtual page 110 belonging to the write-destination address in the write requested by the host 2, and writes the write-data to this real page 111. The write process will be described in detail below.

The real page 111 is an aggregation of storage areas called a stripe 120. Stripe 120 refers to the smallest sequential area allocated to each PDEV when configuring RAID. Stripe size is equivalent to the "first size", and is the maximum size of the data capable of being read at one time from the PDEV 105 (HDD 21).

As described above, a real PDEV 105 corresponds to the HDD 21, and manages a physical capacity. Post-compression data is stored in the real PDEV 105. Post-compression data may be called compressed data. A physical storage area of the real PDEV 105 is managed in a partitioned manner in units called physical chunks 122. The size of a physical chunk 122 may be called either a chunk size or a physical chunk size.

The chunk size is equivalent to the "second size", and has a size that is either equal to or smaller than the aforementioned stripe. For example, the chunk size can be determined from the stripe size and a prescribed data compression ratio that is configured beforehand. In the present embodiment, the prescribed data compression ratio is the maximum compression ratio. For example, when the stripe size is 512 KB and the maximum compression ratio is configured as ⅛, the chunk size is 64 KB (=512*⅛). The chunk size may be configured beforehand, or may be changed by the storage administrator using an appropriate management interface. The chunk size may also by set to a variable length in accordance with a post-compression data length. For example, a plurality of chunk sizes, such as 64 KB, 128 KB, 256 KB, and 512 KB may be prepared, and a physical chunk of an appropriate size may be allocated in accordance with the result obtained by compressing a 512 KB stripe. The overhead required in a process for allocating a plurality of physical chunks can be reduced by preparing chunks of a plurality of sizes beforehand like this.

The virtual PDEV 104 is a storage space for storing data equal to or larger that a physical capacity using compression. The virtual PDEV 104 manages data that has not been compressed (uncompressed data). The storage area of the virtual PDEV 104 is managed in a partitioned manner with respect to each stripe 120. Each stripe 120 is managed in a partitioned manner with respect to each storage area called a sub-stripe 121, which is even smaller.

The size of the sub-stripe 121 is equivalent to the "third size", is a factor of the stripe size, and is configured as a value that is even smaller than both the stripe size and the chunk size. The size of the sub-stripe 121 may be configured taking into account the typical I/O size of the host 2 that uses the virtual volume 101. For example, when a database (not shown in the drawing) mounted to the host 2 accesses the virtual volume 101 in units of 4 KB, the size of the sub-stripe 121 can be configured as 4 KB. The "4" is a factor of 512 KB, which is the stripe size, and is smaller than both the stripe size (512 KB) and the chunk size (64 KB). Furthermore, the sub-stripe size "4" can be divided evenly into the chunk size, and can also be divided evenly into the stripe size. That is, the sub-stripe size may be defined as a value, from among the common divisors of the stripe size and the chunk size, that is selected on the basis of the I/O size of the host 2 that uses the virtual volume 101.

When the host 2 frequently accesses the virtual volume 101 in 2 KB units, the size of the sub-stripe 121 may be configured as 2 KB. The aforementioned stripe size, sub-stripe size, and chunk size are illustrative examples for understanding the present embodiment, and do not purport to limit the scope of the present invention to these numerical values.

As described above, generally speaking, the capacity of the virtual PDEV 104 defines a value that is larger than the capacity of the real PDEV 105. The physical chunks 122 required in accordance with a post-compression data size are allocated to a certain single stripe 120.

The allocation of a physical chunk 122 to a stripe 120 of a virtual PDEV 104 is managed using a physical chunk mapping table 2410 in a stripe management table 24 as described below. As described above, the physical chunk size is smaller than the stripe size, and a plurality of physical chunks 122 can be allocated to a single stripe 120. In accordance with the above-described capacity virtualization function, since the storage system 1 can expend only the physical capacity that corresponds to the post-compression data size, capacity efficiency is enhanced.

The compressed data write location in a physical chunk 122, as will be described below, is managed using a sub-stripe mapping table 2420 in the stripe management table 24. The data of a sub-stripe 121, upon being compressed, is stored in a so-called forward-filled manner inside a physical chunk 122. Forward-filled storage is writing compressed data to a physical chunk 122 in the same order that the host 102 wrote the data to the virtual volume 101 without leaving spaces therebetween.

The corresponding relationship between the virtual volume 101 and the storage pool 102 can be gleaned from a virtual volume number 311 and a pool number 314 of a virtual volume management table 31, which will be described below. The corresponding relationship between the storage pool 102 and the RAID group 103 can be gleaned from a storage pool number 321 and a RAID group list 322 of a storage pool management table 32, which will be described below.

The corresponding relationship between the virtual PDEV 104 for storing uncompressed data and the real PDEV 105 for storing compressed data can be gleaned from a virtual PDEV number 341 and a real PDEV number 342 of a PDEV management table 34, which will be described below.

FIG. 3 shows the logical configuration of a storage area in the CM 13. As the logical configuration of the storage area, for example, the CM 13 has a virtual volume management table 31, a storage pool management table 32, a RAID group management table 33, a PDEV management table 34, a virtual page management table 35, a real page management table 36, a free real page management table 37, a cache memory area 38, and a buffer area 39. Each table will be described in detail below using the drawings.

The cache memory area 38 is used for temporarily storing data written from the host 2 and/or data read from the HDD 21 (PDEV). For example, the controller 10, upon receiving a write command and a data block to be written ("write-data" hereinbelow) from the host 2, stores the data block for the write in the cache memory area 38, and returns a complete response to the host 2.

That is, the controller 10 returns a complete response to the host 2 before storing the write-data in the HDD 21. Because the write performance (write speed) of the cache memory area 38 is generally higher (faster) than that of the HDD 21, the response performance of the storage system 1 with respect to the host 2 can be increased by returning the complete response to the host 2 at the time point when the write-data has been written to the cache memory area 38.

The buffer area 39 is used as a temporary storage area when either decompressing compressed data or compressing uncompressed data.

FIG. 4 is a block diagram showing the logical configuration of a storage area in the HDD 21. As the logical configuration of the storage area, for example, the HDD 21 has a metadata area (control information area) 22, and a data area 23.

The data area 23 stores a data block that has been written from the controller 10. Information for controlling the data area 23 is stored in the control information area 22. The metadata area is an area for storing the control information, and, for example, has a stripe management table 24, a physical chunk management table 25, and a free physical chunk management table 26. Each table 24 to 26 will be described in detail below. Either all or a necessary portion of these tables 24 to 26 may be cached in the CM 13 so that the controller 10 can access the information in the tables at high speed. The tables 24 to 26 may be stored in a memory in the controller 10 (for example, the CM 13) instead of in the HDD 21.

FIG. 5 shows an example of the data configuration of a table 31 for managing a virtual volume. The virtual volume management table 31 has information pertaining to the virtual volume 101.

As items, for example, the virtual volume management table 31 has a volume number 311, a volume capacity 312, an allocated capacity 313, a pool number 314, and a volume attribute 315. In the drawings, "number" is indicated as #.

The volume number 311 is an identifier (ID) for identifying each virtual volume 101 provided by the controller 10. The controller can create a plurality of virtual volumes 101, and allow either one or a plurality of hosts 2 to use them.

The volume capacity 312 is the volume size of the virtual volume 101. The allocated capacity 313 is the capacity allocated to the virtual volume 101, that is, the total size of the real page 111 that is allocated to the virtual volume 101.

The pool number 314 is an ID for identifying the storage pool 102 that has been associated with the virtual volume 101. The pool number 314 corresponds to a storage pool number 321 shown in FIG. 6. A real page 111 that is to be allocated to the virtual volume 101 is selected from among real pages 111 of RAID groups 103 included in the pool number 314.

The volume attribute 315 stores information representing the performance characteristics and/or the capacity characteristics of the virtual volume 101. For example, information representing whether or not the entire virtual volume 101 is compressed can be stored in the volume attribute 315. Information indicating the data processing state of the virtual volume 101 may be stored in the volume attribute 315. Information such as data compression in progress, or data decompression in progress can be included in the information indicating the data processing state.

The storage administrator can change the value of the volume attribute 315 as needed by using an appropriate management interface. For example, the storage administrator can switch the state of the virtual volume 101 between "compressed" and "uncompressed". When the virtual volume 101 has been switched from "uncompressed" to "compressed", a process for compressing and once again storing all the data stored in the virtual volume 101 is executed. Conversely, when the virtual volume 101 has been changed from "compressed" to "uncompressed", a process for decompressing and once again storing all the data stored in the virtual volume 101 is executed.

Generally speaking, when the volume attribute of the virtual volume 101 is set to "compressed", processing for either decompressing or compressing this data occurs each time data is either read from or written to the virtual volume 101. Therefore, the throughput performance of the virtual volume 101 deteriorates.

Thus, it is preferable that the present invention be made so that data for which read requests and/or write requests are frequently generated is not targeted for compression. When it is known that a certain virtual volume is storing only backup data and is not accessed very often, for example, the storage administrator designs performance such that this virtual volume is set to the compression attribute.

FIG. 6 shows an example of the data configuration of a table 32 for managing a storage pool 102. The storage pool management table 32 has information pertaining to the storage pool 102. As items, the storage pool management table 32 has a storage pool number 321, a RAID group list 322, a pool attribute 323, and a number of free virtual pages 324.

The storage pool number 321 is an ID for identifying each storage pool 102 under the management of the controller 10. The RAID group list 322 holds the numbers of either one or a plurality of RAID groups 103 comprising the storage pool 102.

The pool attribute 323 stores information representing performance characteristics and/or capacity characteristics of the storage pool 102. For example, information indicating the type of physical storage device comprising the RAID group 103 that is associated with the storage pool 102 may be stored. The types of storage devices, for example, are either HDD 21 or solid state drives (SSD).

Information representing whether or not the entire storage pool 102 is compressed may be stored in the pool attribute 323. When the entire storage pool 102 is compressed, all the volume attributes of the virtual volumes 101 associated with this storage pool 102 become "compressed". The storage administrator can switch the attribute of the storage pool 102 between "compressed" and "uncompressed" using an appropriate management interface.

When the attribute of the storage pool 102 is "compressed", processing for either decompressing or compressing data occurs each time data is either read from or written to the virtual volume 101 associated with this storage pool 102, and therefore the throughput performance deteriorates. Thus, the storage administrator configures the attribute of the storage pool 102 on the basis of an index as to whether or not deterioration in performance is acceptable.

FIG. 7 shows an example of the data configuration of a table 33 for managing a RAID group 103. The RAID group management table 33 has information pertaining to the RAID group 103. As items, the RAID group management table 33 has a RAID group number 331, a RAID level 332, and a PDEV number 333.

The RAID group number 331 is an ID for identifying a controller 10-managed RAID group 103. The RAID level 332 is information representing the RAID level of the RAID group 103. RAID level "10" indicates a RAID (1+0) configuration. RAID level "5" indicates a RAID 5 configuration. The PDEV number 333 stores an identifier (ID) of a virtual PDEV 104 comprising the RAID group 103. A plurality of PDEV numbers are stored in the PDEV number 333. The PDEV numbers stored in the PDEV number 333 correspond to the virtual PDEV number 341 of a PDEV management table 34.

FIG. 8 shows an example of the data configuration of a table 34 for managing a virtual PDEV 104 and a real PDEV 105. The PDEV management table 34 manages the corresponding relationship between the virtual PDEV 104 and the real PDEV 105.

As items, the PDEV management table 34 has a virtual PDEV number 341, a real PDEV number 342, a physical capacity 343, a logical capacity in use 344, and a physical capacity in use 345.

The virtual PDEV number 341 is an ID for identifying each virtual PDEV 104 under the management of the controller 10. The real PDEV number 342 is an ID for identifying each real PDEV 105 under the control of the controller 10. In FIG. 8, the virtual PDEV numbers and the real PDEV numbers coincide, but these numbers may differ.

The physical capacity 343 represents the maximum size of the data capable of being stored in the HDD 21 corresponding to the real PDEV 105. The logical amount in use 344 represents an amount of data in a case where compressed data stored in the real PDEV 105 is converted to uncompressed data. The physical amount in use 345 represents the size of the data actually being stored in the real PDEV 105. The physical amount in use 345 is equivalent to the post-compression data size.

FIG. 9 shows an example of the data configuration of a table 35 for managing a virtual page 110. The virtual page management table 35, for example, shows the corresponding relationship between a virtual volume 101, a virtual page 110, and a real page 111. As items, the virtual page management table 35 has a virtual volume number 351, a real page pointer 352, a page attribute 353, and statistical information 354.

The virtual page management table 35 corresponds on a one-to-one basis to areas obtained by partitioning the virtual volume 101 into page units. Accordingly, the number of virtual page management tables 35 is proportional to the number of virtual pages 110 comprising the virtual volume 101. The virtual volume number 351 is an ID for identifying a virtual volume 101. The real page pointer 352 is a pointer for indicating the corresponding relationship with a real page management table 36. A NULL entry indicates that a real page has not been allocated. The page attribute 353 represents the attribute of the virtual page 110. As page attributes, there are "compressed", which indicates that the virtual page 110 is compressed, and "uncompressed", which indicates that the virtual page 110 is uncompressed.

The storage administrator can change the value of the page attribute 353 by using an appropriate management interface. However, it is generally troublesome for the administrator to specify a page attribute in virtual page units.

Accordingly, as stated above, the present invention may be such that it is possible to specify whether or not to compression is to be performed in virtual volume units or storage pool units. When the storage administrator has switched the volume attribute 315 of the virtual volume 101 from compressed to uncompressed, or from uncompressed to compressed, the page attribute 353 of all the virtual pages 110 associated with this virtual volume 101 should automatically change as well. In so doing, the change of the virtual volume 101 attribute may be reflected in the virtual page 110 attribute.

When the storage administrator has switched the pool attribute 323 of the storage pool 102 from compressed to uncompressed, or from uncompressed to compressed, the page attribute 353 of all the virtual pages 110 associated with this storage pool 102 should automatically change as well. In so doing, the change of the storage pool 102 attribute may be reflected in the virtual page 110.

The statistical information 354 stores information indicating the access load from the host 2 for virtual page 110 data. For example, input/output per second (IOPS) can be used as the information for indicating the access load. The time point (year, month, day, hour, minute, second) at which the virtual page 110 was last accessed may be stored in the statistical information 354 either in place of the IOPS or together with the IOPS.

The controller 10 may determine whether or not to compress a virtual page 110 on the basis of the statistical information 354. For example, the determination criteria can be such that a virtual page 110 for which the access load is less than a prescribed value is targeted for compression, or a virtual page 110 is targeted for compression when a prescribed period of time (for example, one month) has elapsed since the last access. The present invention may be such that the storage administrator can change the criteria for determining whether or not to compress a virtual page 110 by using an appropriate management interface.

The controller 10 can switch the attribute of the virtual pages 110 to either compressed or uncompressed automatically on the basis of the statistical information 354 and the determination criteria. This makes it possible to use the capacity compression function appropriately within a range that does not affect the performance of the storage system 1. Then, because the storage administrator does not have to manually configure the attributes of the virtual pages 110 one by one while referring to the statistical information 354, management work efficiency increases, and convenience improves.

FIG. 10 shows an example of the data configuration of a table 36 for managing a real page 111. The real page management table 36 has information pertaining to a real page 111. Real page 111 specifies an area obtained by partitioning a RAID group 103 into page units. A real page management table 36 is provided for each real page 111.

As items, the real page management table 36 has a RAID group number 361, a real page start address 362, and a free page pointer 363. The RAID group number 361 is an ID for a RAID group 103 that is under the management of the controller 10. The real page start address 363 shows the start address of a real page 111. As was described using FIG. 2, a real page 111 is configured using a stripe 120 of the virtual PDEVs 104 comprising the RAID group 103.

The free page pointer 363 is used for managing a real page 111 that has not been allocated to a virtual volume 101. Thus, a real page 111 that is not allocated to a virtual volume 101 may be called a free real page below. A data structure for managing a free real page will be described using FIG. 11.

FIG. 11 shows an example of the data configuration of a table 37 for managing a free real page. The free real page management table 37 is a linked list for managing a free real page that is not allocated to a virtual volume 101. The free real page management table 37 is managed in accordance with a free page management pointer 371.

The free page management pointer 371 points to a first real page management table 36 from among a group of free real pages. A free page pointer 362 in the first real page management table 36 points to the next real page management table 36 in the free real page group. In FIG. 11, the free page pointer 362 of the final real page management table 36 is pointing to the free page management pointer 371, but may be a NULL value.

The controller 10, upon receiving a write request from the host 2 for a virtual page 110 that has not been allocated a real page 111, searches for a free real page in any of the RAID groups 103 associated with the virtual volume 101 using the free page management pointer 371 associated with this RAID group 103. The controller 10 allocates the free real page that was found to the write-target virtual page 110. The controller 10 can select the RAID group 103 having the largest number of free real pages from among the RAID groups 103 corresponding to the virtual volume 101, for example.

FIG. 12 shows an example of the data configuration of a table 24 for managing a stripe 120. The stripe management table 24 is for managing which address of the storage area of the real PDEV 105 the compressed data has been stored in.

The stripe management table 24 is stored in the HDD 21. A portion of the frequently used data in the stripe management table 24 may be stored in the memory 13 in the controller 10 instead.

The stripe management table 24 has a stripe physical address 2400, a final physical chunk number 2401, a final physical chunk pointer 2402, a valid data size (uncompressed) 2403, a valid data size (compressed) 2404, a physical chunk mapping table 2410, and a sub-stripe mapping table 2420.

The stripe physical address 2400 is an address (or a stripe number) that indicates the real PDEV 105 storage area to which a stripe 120 corresponds. The final physical chunk number 2401 shows the number for identifying the final physical chunk 122 in which write-data was stored in the stripe 120 identified by the stripe physical address 2400. The final physical chunk pointer 2402 shows the final address of the write-data stored in the final physical chunk.

The stripe management table 24 manages the stripe 120 by combining the final physical chunk number 2401 and the final physical chunk pointer 2402 in this way. When the next write-data for the pertinent stripe 120 has been received from the host 2, this makes it possible for the controller 10 to rapidly identify the location where this write-data should be stored.

The valid data size (uncompressed) 2403 shows the total value of the uncompressed data that has been written to the stripe 120. The valid data size (compressed) 2404 shows the total value of compressed data that has been written to the stripe 120.

The physical chunk mapping table 2410 is for managing a physical chunk 122 that has been allocated to the stripe 120. The physical chunk mapping table 2410 has a physical chunk in stripe number 2411 and a physical chunk address 2412 as components. The physical chunk in stripe number 2411 is identification information for identifying a physical chunk that is allocated to the stripe 120. The physical chunk address 2412 shows the start address of the physical chunk 122 that is allocated to the stripe 120. NULL indicates that a physical chunk 122 is not allocated.

The sub-stripe mapping table 2420 is for managing compressed data that has been stored in any area of the HDD 21 (real PDEV 105) storage area for each sub-stripe 121 obtained by partitioning the stripe 120 into fixed lengths.

The sub-stripe mapping table 2420, for example, associates a sub-stripe number 2421, a storage-destination physical chunk number 2422, an offest in physical chunk 2423, a compression valid flag 2424, and a post-compression data length 2425.

The sub-stripe number 2421 is information (ID) for identifying each sub-stripe 121. The storage-destination physical chunk number 2422 is identification information for identifying the physical chunk 122 where data written to the sub-stripe 121 is stored in a compressed manner. The offset in physical chunk 2423 shows an offset value from the start address of the storage-destination physical chunk 122 to the start address of the data that has been written to this physical chunk 122.

The compression valid flag 2424 is information indicating whether or not the data stored in the physical chunk 122 is compressed. When compressed, "ON" is configured, and when uncompressed, "OFF" is configured. The post-compression data length 2425 shows the size of the compressed data that has been written to the physical chunk 122.

FIG. 13 shows an example of the data configuration of a table 25 for managing a physical chunk 122. The physical chunk management table 25 has information pertaining to a physical chunk 122. The physical chunk 122 is an area obtained by partitioning the storage area of a real PDEV 105 into fixed lengths as described above. A physical chunk management table 25 is provided for each physical chunk 122. In the present example, the physical chunks 122 required to store the compressed data are allocated to the stripe 120 in accordance with the data size after uncompressed data has been compressed.

As components, the physical chunk management table 25 has a physical chunk start address 2500, and a free physical chunk pointer 2501. The physical chunk start address 2500 is a pointer indicating which address of the HDD 21 (real PDEV 105) storage area the physical chunk 122 is associated with. The free physical chunk pointer 2501 is used for managing a physical chunk 122 that has not been allocated to a virtual PDEV 104. A physical chunk 122 that is not allocated to a virtual PDEV 104 may be called a free physical chunk below. A data structure for managing a free physical chunk will be described using FIG. 14.

FIG. 14 shows an example of the data configuration of a table 26 for managing a free physical chunk. The free physical chunk management table 26 is a linked list for managing free physical chunks that are not allocated to a virtual PDEV 104. The free physical chunk management table 26 is managed in accordance with a free physical chunk management pointer 2601.

The free physical chunk management pointer 2601 points to the first physical chunk management table 25 of the management tables for the free physical chunks. The free physical chunk pointer 2501 in the first physical chunk management table 25 points to the next free physical chunk management table 25. In FIG. 14, the free physical chunk pointer 2501 of the final physical chunk management table 25 is indicating the free physical chunk management pointer 2601, but may be a NULL value instead. The allocation of a physical chunk will be described below.

There may be a plurality of free physical chunk management pointers 2601. The fact that an HDD 21 achieves a good response time by reading data that are close to one another in a sequential manner is known as a general performance characteristic of the HDD 21. Accordingly, when allocating a plurality of physical chunks 122 to a stripe 120, from a performance standpoint, it is preferable to allocate physical chunks 122 that are as close to one another as possible. However, since physical chunks are reserved and freed in accordance with the compression ratio, it is difficult to consistently allocate physical chunks that have sequential physical addresses. Accordingly, the storage areas of the HDDs 21 are partitioned into a number of small areas (zones hereinbelow), and the physical chunks 122 are managed by associating a different physical chunk management pointer 2601 to each physical chunk 122 included in the respective zones. Furthermore, the number of zone partitions, such as 32 for example, may be decided beforehand. When allocating a plurality of physical chunks 122 to a stripe 120, physical chunks 122 linked to a certain free physical chunk management pointer 2601 are selected. Strictly speaking, the reserved plurality of physical chunks 122 may not be sequential on the HDD 21, but because the physical addresses thereof fall within the range of a certain zone, it is possible to reserve physical chunks that are relatively close to one another, thereby enabling a plurality of physical chunks 122 that are close to one another on the HDD 21 to be allocated to the stripe 120. As a result of this, when reading data stored on the stripe 120 (a sequential read, for example), data can be read from a plurality of sequential physical chunks, which makes it possible to shorten the response time of the HDD 21.

FIG. 15 is a flowchart showing a write process when the controller 10 has received a write command from the host 2.

The controller 10 analyzes the write command and identifies the number of the virtual page that constitutes the write target (Step 5101). The write command includes information such as the write-target virtual volume number, an LBA in the virtual volume, and a write-data size, for example. The controller 10 is able to identify the virtual page number based on a result obtained by dividing the LBA by the virtual page size, for example.

The controller 10 determines whether or not a real page 111 has been allocated to the write-target virtual page 110 in accordance with whether a real page pointer 352 of the virtual page management table 35 has been entered (Step 5102). When a real page 111 has been allocated to the write-target virtual page 110 (Step 5102: No), processing advances to Step 5106, which will be described below.

When a real page 111 has not been allocated to the write-target virtual page 110 (Step 5102: Yes), the controller 10 allocates a new real page 111 of the same size as the virtual page to the write-target virtual page 110 (Step 5103). The controller 10 refers to the free page management pointer 371 and identifies one unused real page 111. The controller 10 associates the identified unused real page 111 with the virtual page management table 35 for the write-target virtual page 110. This makes it possible to allocate a new real page 111 to the virtual page 110.

The controller 10 determines whether or not either the volume attribute 315 of the write-target virtual volume 101 or the pool attribute 323 of the storage pool 102 associated with the virtual volume 101 is compressed (Step 5104). When neither the volume attribute 315 of the write-target virtual volume 101 nor the pool attribute 323 of the storage pool 102 is compressed (Step 5104: No), processing advances to Step 5108. In Step 5108, the controller 10 associates a certain one free physical chunk management pointer 2601 with a certain real page 111 so that the physical storage destinations of the data of the real page 111 constitute sequential areas, and allocates physical chunks 122 that are ordinarily linked to this free physical chunk management pointer 2601. The use of sequential physical chunks 122 to store data makes it possible to reduce overhead resulting from accessing the stripe management table 24 when the attribute is uncompressed.

The reason for this will be explained. In this example, the real page 111 physical storage destination of the data is managed in accordance with the stripe management table 24 for each stripe 120 comprising the real page 111. Because the stripe management table 24 is stored on the HDD 21, it takes time for the controller 10 to access this table 24. In addition, because a physical storage destination is allocated for each sub-stripe 121, the controller 10 must identify the addresses of a plurality of physical storage destinations when reading data that spans a plurality of sub-stripes 121, thereby increasing the processing load of the controller 10.

Accordingly, in the present example, when data is uncompressed, the controller 10 reserves in sequential areas physical chunks 122 of a size that is proportional to the real page 111, and stores the start address thereof in the real page start address 362 of the real page management table 36. In order to allocate physical chunks 122 using sequential areas, for example, separate free physical chunk management pointers 2601 may be used when the virtual page 110 attribute is configured to compressed (when the compression attribute is valid) and when the virtual page 110 attribute is configured to uncompressed (when the compression attribute is invalid), respectively.

When uncompressed data is stored in the virtual page 110, the controller 10 can identify a physical storage destination by simply referring to the real page management table 36 by using physical chunks 122 comprising sequential areas without referring to the stripe management table 24. This makes it possible to reduce controller 10 overhead. After Step 5108, processing proceeds to Step 5106.

When compressed has been configured in either the volume attribute 315 of the virtual volume 101 or the pool attribute 323 of the storage pool 102 (Step 5104: Yes), the controller 10 changes the attribute 353 of the write-target virtual page 110 to compressed (Step 5105). Thereafter, processing advances to Step 5106.

The controller 10 transfers the write-target data (write-data formed from one or more data blocks) to the cache memory area 38 (Step 5106). Hereinbelow, the cache memory area 38 in the CM 13 may be called either cache memory or cache.

Lastly, the controller 10, via the host I/F 11, notifies the host 2, which is the issuer of the write command, to the effect that the write-data write has been completed (Step 5107).

FIG. 16 is a flowchart showing a destage process. The destage process is for storing in a prescribed area of the HDD 21 cache 38-stored data that has yet to be written to the HDD 21. The destage process can be implemented asynchronously with respect to the timing of the processing of the write request from the host 2 (Step 5200).

The controller 10 determines whether the destage-target data stored in the real page 111 is either RAID 5 or RAID 6 (Step 5201). The determination should be made in accordance with the RAID group management table 33 by checking the RAID level 332 for the RAID group #361 of the real page management table 36. When the destage-target data is stored as either RAID 5 or RAID 6, the controller 10 creates parity for the destage-target data (Step 5202).

The controller 10 determines whether the real page 111 attribute of the destage target is compressed in accordance with the page attribute 353 of the associated virtual page management table 35 (Step 5203). When a compression attribute has been configured in the detage-target real page 111 (Step 5203: Yes), the controller 10 destages the real page 111 data in a compressed manner (Step 5204). This processing will be described below using FIG. 17.

When the compression attribute is not assigned to the destage-target real page 111 (Step 5203: No), the controller 10 refers to the real page management table 36 and acquires the physical address where the destage-target data is stored (Step 5205). When destaging to a real page 111 for which the compression attribute has not been assigned like this, the data is stored by overwriting the same physical address. In so doing, the capacity efficiency of the physical area is enhanced because the physical area can be reused. Then the controller 10 writes the destage-target data to the HDD 21 by transferring same from the cache 38 (Step 5206).

FIG. 17 shows a flowchart of the process for destaging compressed data. This process is Step 5204 of FIG. 16 in detail. This flowchart is executed for cache dirty data, and the maximum dirty size processed at one time is the stripe size.

The controller 10 reserves a buffer area 39 for storing compressed data in the CM 13 (Step 5301). The controller 10 compresses the destage-target data on the cache 38 into sub-stripe units 121 using the compression/decompression part F3 in accordance with a prescribed algorithm, and stores the compressed data to the buffer 39 reserved in Step 5301 (Step 5302).

The controller 10 determines whether or not an allocated physical chunk 122 exists for the stripe 120 having the destage-target data in accordance with whether a physical chunk address 2412 is being managed (Step 5303). When there is no physical chunk 122 allocated to the destage-target stripe 120 (Step 5303: No), processing advances to Step 5307, which will be described below. When one or more physical chunks 122 are allocated to the target stripe 120 (Step 5303: Yes), processing proceeds to Step 5304.

The controller 10 determines whether there is enough free capacity in the physical chunk 122 allocated to the target stripe 120 to be able to store the destage-target data (Step 5304). When the free capacity for storing the destage-target data does not exist in the physical chunk 122 (Step 5304: No), processing advances to Step 5307. Because the compressed data is stored in the physical chunk 121 in a forward-filled manner, the area from the physical chunk address 2412 of the pertinent physical chunk 122 to the final physical chunk pointer 2402 is a used area, and the area from the final physical chunk pointer 2402 to the end of the pertinent physical chunk 122 is the free capacity in the pertinent physical chunk 122. When free capacity exists (Step 5304: Yes), processing proceeds to Step 5305.

The controller 10 writes the compressed data to the address pointed to by the final physical chunk pointer 2402 of the stripe management table 24 (Step 5305).

Alternatively, when processing has advanced to Step 5307, the controller 10 executes a physical chunk allocation process (Step 5307). This process will be described below using FIG. 18. The controller 10, after having allocated a new physical chunk 122, writes the compressed data to the head of this allocated physical chunk 122 (Step 5308). The head of the physical chunk 122 is determined by referring to the physical chunk address 2412. Lastly, the controller 10 updates the stripe management table 24 (Step 5306).

FIG. 18 shows a flowchart of a process for allocating a physical chunk. This process is Step 5307 of FIG. 17 shown in detail.

The controller 10 determines whether or not the size of the destage-target data is equivalent to the stripe size (Step 5401).

When the size of the destage-target data is equivalent to the stripe size (Step 5401: Yes), the controller 10 reserves a free physical chunk 122 by referring to the free physical chunk management table 26, and allocates the physical chunk 122 to the target stripe 120 (Step 5407).

When overwriting the data of the entire stripe 120 to the HDD 21, the allocation of a new physical chunk 122 to this stripe 120 after having discarded all the previously stored old data makes the update process for the physical chunk management table 25 easier. Accordingly, in the present example, when the size of the destage-target data matches the stripe size, a new free physical chunk 122 is reallocated to the target stripe 120.

When the size of the destage-target data is not equivalent to the stripe size (Step 5401: No), the controller 10 determines whether the number of physical chunks 122 allocated to the target stripe 120 is equal to or less than a prescribed threshold ThPC (Step 5402). The prescribed threshold ThPC, for example, is the maximum number of physical chunks that can be allocated to a single stripe 120, that is, the number of physical chunks in a case where the size of the stripe and the total size of the physical chunks allocated to this stripe are a match. When the maximum compression ratio is ⅛, the threshold ThPC becomes 8.

When the number of allocated physical chunks is equal to or less than the threshold ThPC (Step 5402: Yes), the controller 10 reserves a free physical chunk by referring to the free physical chunk management pointer 2601 (Step 5403). The controller 10 reserves on a priority basis an already allocated physical chunk and a physical chunk that is nearby on the HDD 21. Specifically, the controller 10 reserves in a selective manner an already allocated physical chunk, and a physical chunk 122 that is linked to the same free physical chunk management pointer 2601. The allocation of physical chunks 122 in locations that are as close to one another as possible enables the seek time of the HDD 21 to be reduced when reading the stripe 120 data, and makes it possible to enhance the HDD 21 response time. The controller 10 updates the physical chunk management table 25 (Step 5404) and ends the processing.

Alternatively, when the number of allocated physical chunks exceeds the threshold ThPC (Step 5402: No), processing advances to Step 5405 described below.

In the present example, when updating the data that has been stored in the stripe 120, priority is placed on using a free area in an already allocated physical chunk, and therefore old data is left in the physical chunk 122. Since write-data is written to the physical chunk 122 in the so-called forward-filled manner, overwrite-target old data is left as-is in the physical chunk 122.

Accordingly, in this example, when the total size of the physical chunks 122 allocated to the stripe 120 exceed the stripe size (number of allocated physical chunks >ThPC), the controller 10 reads the data of all the physical chunks 122 associated with the target stripe (Step 5405), reallocates a new free physical chunk 122 to the stripe 120 (Step 5406), and once again stores only the required data in a forward-filled manner (Step 5407). This makes it possible to remove useless data, and to use the physical chunks 122 effectively.

For example, consider a case in which unnecessary data accumulates as a result of repeated update writes to a certain stripe 120, making it necessary to allocate to this stripe 120 a ninth physical chunk 122, which exceeds the threshold ThPC. In this case, the controller 10 refers to the physical chunk mapping table 2410, and reads all the data from the eight allocated physical chunks 122 to the target stripe 120. Next, the controller 10 refers to the sub-stripe mapping table 2420, and stores only data corresponding to the respective sub-stripes in a forward-filled manner in a newly allocated physical chunk 122. A free area is created in the physical chunk 122 as a result of the unnecessary old data being eliminated. When the total size of the unnecessary old data is equal to or larger than the physical chunk size, one whole physical chunk 122 can be re-used as a free physical chunk.

As described above, in Step 5405, the controller 10 reads the data of all the physical chunks 122 associated with the target stripe 120 to the buffer 39, and proceeds to Step 5406.

In Step 5406, the controller 10 rearranges the data read to the buffer 39 in Step 5405 in sub-stripe number order on the buffer 39. At this time, the data in the sub-stripe that includes the destage-target compressed data is replaced with the new data that was compressed in Step 5302 rather than the data read to the buffer 39 in Step 5405.

In Step 5407, the controller 10 refers to the free physical chunk management pointer 2601, newly reserves the physical chunks 122 needed to store the compressed data from areas that are as close to one another as possible in the same manner as in Step 5403, and advances to Step 5408.

In Step 5408, the controller 10 registers the physical chunk 122 that has become free in the free physical chunk management table 26. Lastly, the controller 10 updates the physical chunk management table 25 (Step 5404).

FIG. 19 shows a flowchart for processing a read command. The controller 10 analyzes a read command received from the host 2, and identifies the read-target LBA (Step 5501).

The controller 10 determines whether read-target data is stored in the cache memory 38 (Step 5502). When read-target data is stored in the cache memory 38 (Step 5502: Yes), the controller 10 transfers the read-target data stored in the cache memory 38 to the host 2 via the host I/F 11 (Step 5505).

Alternatively, when read-target data is not stored in the cache memory 38 (Step 5502: No), the controller 10 reserves a new cache slot in the cache memory 38 for storing the read-target data (Step 5503).

The controller 10 executes a staging process for the cache memory 38 (Step 5504). The staging process to the cache memory 38 is a process for transferring and storing in the cache memory 38 the read-target data that is in the HDD 21 (real PDEV 105). This processing will be described below using FIG. 20. When the transfer of the read-target data from the HDD 21 to the cache memory 38 is complete, the controller 10 transfers the read-target data on the cache memory 38 to the host 2 via the host I/F 11.

FIG. 20 shows a flowchart of a cache staging process. This processing shows Step 5504 of FIG. 19 in detail. In this process, the controller 10 reads the read-target data from the HDD 21 and stores same in the cache memory 38.

The controller 10 calculates the number of the virtual page 110 that constitutes the read target on the basis of a read-target address extracted from the read command (Step 5601). When the size of the virtual page 110 is fixed, the controller 10, for example, can identify the virtual page number from the result obtained by dividing the LBA by the virtual page size.

The controller 10 acquires the real page pointer 352 from within the virtual page management table 35 (Step 5602). The controller determines whether the real page pointer 352 is not NULL (Step 5603). When the real page pointer 352 is NULL (Step 5603: No), processing advances to Step 5607. A case where the real page pointer 352 is NULL is one in which the host 2 has not written data to the virtual page 110 even once, and there is no data to be read. Accordingly, the controller 10 stores the data 0 in the cache memory 38, and ends the processing.

When the result of the determination in Step 5603 is Yes, that is, when the real page pointer 352 is not NULL, processing proceeds to Step 5604. The controller 10 determines whether or not the attribute of the read-target virtual page 110 is compressed (Step 5604). The controller 10 makes the determination of Step 5604 by referring to the page attribute 353 included in the virtual page management table 35. When the result of the determination of Step 5604 is Yes, processing proceeds to Step 5605, and the compressed data staging process is executed (Step 5605). When the result of the determination of Step 5604 is No, processing advances to Step 5606.

In Step 5606, the controller 10 reads the read-target data to the cache memory 38. In this case, since the page attribute is uncompressed, the controller 10 can identify the physical address where the target data is stored from the real page start address 362 in the real page management table 36 without referring to the stripe management table 24. Then, the controller 10 ends the processing.

FIG. 21 shows a flowchart of a process for staging compressed data. This processing shows Step 5605 of FIG. 20 in detail.

The controller 10 acquires the physical address where the read-target data is stored by referring to the stripe management table 24 that corresponds to the read-target stripe (Step 5701). The controller 10, in accordance with the data size requested by the host 2, determines whether to read the data in stripe units, or to read the data in sub-stripe units (Step 5702).

In Step 5702, the controller 10 makes the determination using criteria such as whether to read the data in physical chunk size units (first read mode), whether to read the data in sub-stripe size units (second read mode), or which read method will enable the number of reads to the HDD 21 to be reduced. This is because a fewer number of reads makes it possible to enhance throughput performance at the time of an HDD 21 data read.

Accordingly, in this example, to realize the above-described determination criteria, the controller 10 determines whether a value obtained by dividing the size requested by the host 2 for the read by the size of the sub-stripe 121 (=requested size/sub-stripe size), for example, is larger than the number of physical chunks 122 allocated to the stripe 120 (Step 5702).

The determination formula for Step 5702 will be described. The "number of physical chunks 122 allocated to the stripe 120" here is equivalent to the number of reads to the HDD 21 when reading the data in physical chunk units. The controller 10 can determine the number of physical chunks allocated to the stripe 120 by referring to the physical chunk mapping table 2410, and counting the number of physical chunks that do not have NULL for the physical chunk address 2412 corresponding to the physical chunk in stripe 2411. The controller 10 can read data from the HDD 21 in physical chunk units. Alternatively, the "requested size/sub-stripe size" is equivalent to the number of reads to the HDD 21 when reading data in sub-stripe units. Therefore, the controller 10 can determine the magnitude of the number of reads to the HDD 21 by comparing a value, which was obtained by dividing the host 2-requested read size by the sub-stripe size, to the number of physical chunks 122 that have been allocated to the stripe 120.

When the value of the (requested size/sub-stripe size) is larger than the number of allocated physical chunks (Step 5702: Yes), the number of reads to the HDD 21 is smaller when the data is read in stripe units.

Accordingly, the controller 10 reserves a buffer 39 of the size required for reading the data in stripe-size segments (Step 5703). The controller 10 refers to the physical chunk mapping table 2410, and reads the data (compressed data) of all the physical chunks 122 associated with the stripe 120 to the buffer area 39 (Step 5704). The controller 10, in sub-stripe number order, decompresses the compressed data stored in the buffer 39, stores the read-target data, which has been restored to the uncompressed state, in the cache 38, and thereafter ends the processing.

Alternatively, when the value of the (requested size/sub-stripe size) is equal to or less than the number of allocated physical chunks (Step 5702: No), the number of reads to the HDD 21 is smaller when the data is read in sub-stripe units.

Accordingly, the controller 10 reserves a buffer 39 that is at least equivalent to the data size requested by the host 2 (Step 5706). The controller 10 reads the read-target sub-stripe data from the HDD 21 and stores same in the buffer 39 by referring to the sub-stripe mapping table 2420 (Step 5707). The controller 10 decompresses the compressed data of the buffer 39, and stores the decompressed data in the cache memory 38 (Step 5708). Then, the controller 10 ends the processing.

According to the present example, which is configured in this manner, the sub-stripe size is set as the compression/decompression unit, and compressed data is written in a forward-filled manner in physical chunk-size storage areas, thereby enabling the controller 10 to ascertain the location of compressed data by simply managing offset values in the physical chunks. Therefore, a compressed data physical storage destination can be efficiently managed. In addition, since all that is required is the management of offset values, the table size can be made smaller, and the CM 12 storage area can be used efficiently.

In the present example, as was described using FIG. 21, the number of reads to the HDD 21 is reduced by preparing two types of read modes when reading compressed data from the HDD 21, and optimizing the size at read time. Therefore, throughput performance can be improved when reading data from the HDD 21.

In the present example, when small-size data is read, it is possible to suppress the decompression of unnecessary data other than the target data, and, in addition, when large-size data is read, the loads on the controller 10 and the HDD 21 can be reduced.

In the present example, when large-size data is read, the data is read in chunk units and decompressed in sub-stripe units, and the data is rearranged in logical address order in the cache memory 38. In the present example, because a large-size sequential read request can be processed in chunk units, the processing load on the controller 10 can be lightened, the number of accesses to the HDD 21 can be curbed, and the load on the HDD 21 can be reduced. In the present example, HDD 21 throughput performance can be enhanced when the controller 10 reads compressed data in a sequential manner.

In the present example, because data is read and written in sub-stripe units in the case of small-size data, target data alone may be either compressed or decompressed; there is no need to either compress or decompress unnecessary data. Therefore, processing performance is enhanced.

The above-described example is one example for the understanding and implementation of the present invention, and the present invention is not limited to something that comprises all of the configurations that have been described above. There may be cases in which a portion of the configurations of the example can be replaced with other configurations, a portion of the configurations can be removed, and a certain configuration can be combined with another configuration to form a single configuration.

The above configurations, functions, processors, and so forth may be realized using hardware by designing either a portion or all thereof as an integrated circuit. Or, the above configurations, functions, and so forth may be realized using software in accordance with a processor being configured to interpret and execute a program for realizing the respective functions.

In addition, the configurations disclosed in the claims can also be combined in various ways other than the stated combination.

REFERENCE SIGNS LIST

1 Storage apparatus
2 Host computer
10 Controller
101 Virtual volume
102 Storage pool
103 RAID group
104 Virtual PDEV
105 Real PDEV
110 Virtual page
111 Real page
120 Stripe
121 Sub-stripe
122 Physical chunk

The invention claimed is:

1. An efficient management storage system comprising:
at least one storage device, wherein a first size unit is a maximum size of data that can be read at one time from the at least one storage device, a second size unit is equal to or smaller than the first size unit, and a third size unit is a factor of the first size unit and is configured at a smaller value than the first size unit and the second size unit, wherein the first size unit, the second size unit and the third size unit are predefined;
a cache;
a controller for controlling storage of data on the storage device by providing a virtual volume comprising a plurality of virtual pages, receiving a request for write to the virtual volume, allocating in accordance with a virtual page size a pool area comprising a plurality of stripes data of the first size, and stores a write request data in the cache, when writing the data stored in the cache to the storage device, creates compressed data by compressing the data in accordance with the third size unit, and selects a storage area of the storage device in accordance with the second size unit, and writes the compressed data to a selected second size storage area consecutively and sequentially from a start address of a free area of the second size storage area;
the controller is configured to select a first read mode having determined that a value obtained by dividing the size of a target data of a read request by the third size is larger than a second value, wherein the second value is a number of the second size storage areas that have been allocated to a first size storage area and read a target-data compressed data from all the second size storage areas associated with the first size storage areas, which record the read request target data, and respond to the read request;
the controller is configured to select a second read mode having determined the value is smaller than the second value, wherein the second value is a number of the second size storage areas that have been allocated to the first size storage area, read a target-data compressed data in the third size units from among the second size storage areas associated with the first size storage areas, which record the read request target data, and respond to the read request to decompress the read compressed data in the third size units, rearrange the decompressed data in a prescribed order, and respond to the read request, and
wherein, when there is a free area of equal to or larger than the size of the compressed data in the second size storage area where the stripe data, which comprises the data stored in the cache, is already stored, the controller is configured to write the compressed data to a free area of the allocated second size storage area.

2. The efficient management storage system according to claim 1, wherein the storage device is a disk drive, and
when selecting a storage area of the disk drive in accordance with the second size units, the controller is configured to select on a priority basis a second size storage area that is in terms of physical distance near, on the disk drive, to the second size storage area where the stripe data, which comprises the data stored in the cache, is already stored.

3. The efficient management storage system according to claim 2, wherein, when writing the compressed data to the selected second size storage area, the controller is configured to remove unnecessary data from among the data already written to the second size storage area when the stripe data is already stored, and write only valid data sequentially from the start address of a newly selected second size storage area without leaving spaces there between.

4. The efficient management storage system according to claim 1, wherein, when writing the compressed data to the storage device, the controller is configured to select anew the second size storage area from physical storage areas of the storage device when the size of the compressed data matches the first size.

5. The efficient management storage system according to claim 1, wherein it is determined whether or not data is managed in a compressed manner in either a virtual volume unit or pool unit.

6. The efficient management storage system according to claim 1, wherein it is determined whether or not the data is managed in a compressed manner in units of virtual pages, which comprise the virtual volume.

7. The efficient management storage system according to claim 6, wherein the controller is configured to automatically determine whether or not the data is to be managed in a compressed manner in accordance with virtual page usage conditions.

8. A method for controlling at least one storage device by a controller, wherein a first size unit, is a maximum size of data that can be read at one time from the storage device, a second size unit, is equal to or smaller than the first size unit, and a third size unit, is a factor of the first size unit and is configured at a smaller value than the first size unit and the second size unit, wherein the first size unit, the second size unit and the third size unit are predefined, the storage device control method comprising operating the controller to:

provide a virtual volume comprising a plurality of virtual pages;

receiving a request for write to the virtual volume, allocate in accordance with a virtual page size a pool area comprising a plurality of stripes of the first size, and store a write request data in a cache;

writing the data stored in the cache to the storage device, create compressed data by compressing the data in accordance with the third size unit;

selecting a storage area of the storage device in accordance with the second size unit;

writing the compressed data to a selected second size storage area sequentially from a start address of a free area of the second size storage area;

selecting a first read mode having determined that a value obtained by dividing the size of a target data of a read request by the third size is larger than a second value, wherein the second value is a number of the second size storage areas that have been allocated to a first size storage area and read a target-data compressed data from all the second size storage areas associated with the first size storage areas, which record the read request target data, and respond to the read request;

selecting a second read mode having determined the value is smaller than the second value wherein the second value is a number of the second size storage areas that have been allocated to the first size storage area, read a target-data compressed data in the third size units from among the second size storage areas associated with the first size storage areas, which record the read request target data, and respond to the read request to decompress the read compressed data in the third size units, rearrange the decompressed data in a prescribed order, and respond to the read request, and wherein, when there is a free area of equal to or larger than the size of the compressed data in the second size storage area where the stripe data, which comprises the data stored in the cache, is already stored, the controller is configured to write the compressed data to a free area of the already allocated second size storage area.

* * * * *